United States Patent
Deen et al.

(10) Patent No.: US 10,623,282 B2
(45) Date of Patent: *Apr. 14, 2020

(54) SYSTEM AND METHOD OF DETECTING HIDDEN PROCESSES BY ANALYZING PACKET FLOWS

(71) Applicant: Cisco Technology, Inc., San Jose, CA (US)

(72) Inventors: Khawar Deen, Sunnyvale, CA (US); Navindra Yadav, Cupertino, CA (US); Anubhav Gupta, Sunnyvale, CA (US); Shashidhar Gandham, Fremont, CA (US); Rohit Chandra Prasad, Sunnyvale, CA (US); Abhishek Ranjan Singh, Pleasanton, CA (US); Shih-Chun Chang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/171,930

(22) Filed: Jun. 2, 2016

(65) Prior Publication Data

US 2016/0359879 A1 Dec. 8, 2016

Related U.S. Application Data

(60) Provisional application No. 62/171,899, filed on Jun. 5, 2015.

(51) Int. Cl.
*H04L 9/00* (2006.01)
*H04L 12/26* (2006.01)
(Continued)

(52) U.S. Cl.
CPC .......... *H04L 43/045* (2013.01); *G06F 3/0482* (2013.01); *G06F 3/04842* (2013.01);
(Continued)

(58) Field of Classification Search
CPC ............. H04L 63/1416; H04L 63/1458; H04L 63/1408; H04L 63/1425; H04L 63/145;
(Continued)

(56) References Cited

U.S. PATENT DOCUMENTS 5,086,385 A 2/1992 Launey et al.
5,319,754 A 6/1994 Meinecke et al.
(Continued)

FOREIGN PATENT DOCUMENTS

CN 101093452 12/2007
CN 101770551 7/2010
(Continued)

OTHER PUBLICATIONS

Bosch, Greg, "Virtualization," 2010, 33 pages.
(Continued)

*Primary Examiner* — Alexander Lagor
(74) *Attorney, Agent, or Firm* — Polsinelli PC

(57) ABSTRACT

A method includes capturing first data associated with a first packet flow originating from a first host using a first capture agent deployed at the first host to yield first flow data, capturing second data associated with a second packet flow originating from the first host from a second capture agent deployed outside of the first host to yield second flow data and comparing the first flow data and the second flow data to yield a difference. When the difference is above a threshold value, the method includes determining that a hidden process exists and corrective action can be taken.

20 Claims, 8 Drawing Sheets

(51) Int. Cl.

| | |
|---|---|
| H04L 29/06 | (2006.01) |
| G06F 9/455 | (2018.01) |
| G06N 20/00 | (2019.01) |
| G06F 16/29 | (2019.01) |
| G06F 16/248 | (2019.01) |
| G06F 16/28 | (2019.01) |
| G06F 16/9535 | (2019.01) |
| G06F 16/2457 | (2019.01) |
| G06F 21/55 | (2013.01) |
| G06F 21/56 | (2013.01) |
| H04L 12/851 | (2013.01) |
| H04L 12/24 | (2006.01) |
| H04W 84/18 | (2009.01) |
| H04L 29/08 | (2006.01) |
| G06F 21/53 | (2013.01) |
| H04L 12/723 | (2013.01) |
| G06F 3/0484 | (2013.01) |
| H04L 1/24 | (2006.01) |
| H04W 72/08 | (2009.01) |
| H04L 9/08 | (2006.01) |
| H04L 9/32 | (2006.01) |
| H04J 3/06 | (2006.01) |
| H04J 3/14 | (2006.01) |
| H04L 29/12 | (2006.01) |
| H04L 12/813 | (2013.01) |
| H04L 12/823 | (2013.01) |
| H04L 12/801 | (2013.01) |
| H04L 12/741 | (2013.01) |
| H04L 12/833 | (2013.01) |
| H04L 12/721 | (2013.01) |
| G06F 3/0482 | (2013.01) |
| G06T 11/20 | (2006.01) |
| H04L 12/841 | (2013.01) |
| H04L 12/725 | (2013.01) |
| H04L 12/715 | (2013.01) |
| G06F 16/16 | (2019.01) |
| G06F 16/17 | (2019.01) |
| G06F 16/11 | (2019.01) |
| G06F 16/13 | (2019.01) |
| G06N 99/00 | (2019.01) |
| G06F 16/174 | (2019.01) |
| G06F 16/23 | (2019.01) |

(52) U.S. Cl.
CPC ...... *G06F 3/04847* (2013.01); *G06F 9/45558* (2013.01); *G06F 16/122* (2019.01); *G06F 16/137* (2019.01); *G06F 16/162* (2019.01); *G06F 16/17* (2019.01); *G06F 16/173* (2019.01); *G06F 16/174* (2019.01); *G06F 16/1744* (2019.01); *G06F 16/1748* (2019.01); *G06F 16/235* (2019.01); *G06F 16/2322* (2019.01); *G06F 16/2365* (2019.01); *G06F 16/248* (2019.01); *G06F 16/24578* (2019.01); *G06F 16/285* (2019.01); *G06F 16/288* (2019.01); *G06F 16/29* (2019.01); *G06F 16/9535* (2019.01); *G06F 21/53* (2013.01); *G06F 21/552* (2013.01); *G06F 21/566* (2013.01); *G06N 20/00* (2019.01); *G06N 99/00* (2013.01); *G06T 11/206* (2013.01); *H04J 3/0661* (2013.01); *H04J 3/14* (2013.01); *H04L 1/242* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01); *H04L 45/74* (2013.01); *H04L 47/11* (2013.01); *H04L 47/20* (2013.01); *H04L 47/2441* (2013.01); *H04L 47/2483* (2013.01); *H04L 47/28* (2013.01); *H04L 47/31* (2013.01); *H04L 47/32* (2013.01); *H04L 61/2007* (2013.01); *H04L 63/0227* (2013.01); *H04L 63/0263* (2013.01); *H04L 63/06* (2013.01); *H04L 63/0876* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/16* (2013.01); *H04L 63/20* (2013.01); *H04L 67/10* (2013.01); *H04L 67/1002* (2013.01); *H04L 67/12* (2013.01); *H04L 67/16* (2013.01); *H04L 67/36* (2013.01); *H04L 67/42* (2013.01); *H04L 69/16* (2013.01); *H04L 69/22* (2013.01); *H04W 72/08* (2013.01); *H04W 84/18* (2013.01); *G06F 2009/4557* (2013.01); *G06F 2009/45587* (2013.01); *G06F 2009/45591* (2013.01); *G06F 2009/45595* (2013.01); *G06F 2221/033* (2013.01); *G06F 2221/2101* (2013.01); *G06F 2221/2105* (2013.01); *G06F 2221/2111* (2013.01); *G06F 2221/2115* (2013.01); *G06F 2221/2145* (2013.01); *H04L 67/22* (2013.01)

(58) Field of Classification Search
CPC ....... H04L 63/20; H04L 43/026; H04L 47/10; H04L 47/2441
See application file for complete search history.

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,829 A | 4/1998 | Davis et al. |
| 5,831,848 A | 11/1998 | Rielly et al. |
| 5,903,545 A | 5/1999 | Sabourin et al. |
| 6,012,096 A | 1/2000 | Link et al. |
| 6,141,595 A | 10/2000 | Gloudeman et al. |
| 6,144,962 A | 11/2000 | Weinberg et al. |
| 6,239,699 B1 | 5/2001 | Ronnen |
| 6,247,058 B1 | 6/2001 | Miller et al. |
| 6,249,241 B1 | 6/2001 | Jordan et al. |
| 6,330,562 B1 | 12/2001 | Boden et al. |
| 6,353,775 B1 | 3/2002 | Nichols |
| 6,525,658 B2 | 2/2003 | Streetman et al. |
| 6,611,896 B1 | 8/2003 | Mason, Jr. et al. |
| 6,654,750 B1 | 11/2003 | Adams et al. |

(56) References Cited

U.S. PATENT DOCUMENTS

| | | | |
|---|---|---|---|
| 6,728,779 B1 | 4/2004 | Griffin et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,111,055 B2 | 9/2006 | Falkner |
| 7,120,934 B2 | 10/2006 | Ishikawa |
| 7,181,769 B1 | 2/2007 | Keanini et al. |
| 7,185,103 B1 | 2/2007 | Jain |
| 7,203,740 B1 | 4/2007 | Putzolu et al. |
| 7,302,487 B2 | 11/2007 | Ylonen et al. |
| 7,349,761 B1 | 3/2008 | Cruse |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,783,457 B2 | 8/2010 | Cunningham |
| 7,787,480 B1 | 8/2010 | Mehta et al. |
| 7,788,477 B1 | 8/2010 | Huang et al. |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,115,617 B2 | 2/2012 | Thubert et al. |
| 8,135,657 B2 | 3/2012 | Kapoor et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,185,824 B1 | 5/2012 | Mitchell et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,588,081 B2 | 11/2013 | Salam et al. |
| 8,600,726 B1 | 12/2013 | Varshney et al. |
| 8,615,803 B2 | 12/2013 | Dacier et al. |
| 8,630,316 B2 | 1/2014 | Haba |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |
| 8,954,610 B2 | 2/2015 | Berke et al. |
| 8,966,021 B1 | 2/2015 | Allen |
| 8,973,147 B2 | 3/2015 | Pearcy et al. |
| 8,990,386 B2 | 3/2015 | He et al. |
| 8,996,695 B2 | 3/2015 | Anderson et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,130,836 B2 | 9/2015 | Kapadia et al. |
| 9,160,764 B2 | 10/2015 | Stiansen et al. |
| 9,178,906 B1 | 11/2015 | Chen et al. |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,258,217 B2 | 2/2016 | Duffield et al. |
| 9,281,940 B2 | 3/2016 | Matsuda et al. |
| 9,286,047 B1 | 3/2016 | Avramov et al. |
| 9,317,574 B1 | 4/2016 | Brisebois et al. |
| 9,319,384 B2 | 4/2016 | Yan et al. |
| 9,369,435 B2 | 6/2016 | Short et al. |
| 9,378,068 B2 | 6/2016 | Anantharam et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,501,744 B1 | 11/2016 | Brisebois et al. |
| 9,531,589 B2 | 12/2016 | Clemm et al. |
| 9,563,517 B1 | 2/2017 | Natanzon et al. |

(56) References Cited

U.S. PATENT DOCUMENTS

| | | |
|---|---|---|
| 9,634,915 B2 | 4/2017 | Bley |
| 9,645,892 B1 | 5/2017 | Patwardhan |
| 9,684,453 B2 | 6/2017 | Holt et al. |
| 9,697,033 B2 | 7/2017 | Koponen et al. |
| 9,733,973 B2 | 8/2017 | Prasad et al. |
| 9,749,145 B2 | 8/2017 | Banavalikar et al. |
| 9,800,608 B2 | 10/2017 | Korsunsky et al. |
| 9,904,584 B2 | 2/2018 | Konig et al. |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0141343 A1 | 10/2002 | Bays |
| 2002/0184393 A1 | 12/2002 | Leddy et al. |
| 2003/0023601 A1 | 1/2003 | Fortier, Jr. et al. |
| 2003/0065986 A1 | 4/2003 | Fraenkel et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2004/0019676 A1 | 1/2004 | Iwatsuki et al. |
| 2004/0030776 A1 | 2/2004 | Cantrell et al. |
| 2004/0213221 A1 | 10/2004 | Civanlar et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0063377 A1 | 3/2005 | Bryant et al. |
| 2005/0083933 A1 | 4/2005 | Fine et al. |
| 2005/0108331 A1 | 5/2005 | Osterman |
| 2005/0166066 A1 | 7/2005 | Ahuja et al. |
| 2005/0177829 A1 | 8/2005 | Vishwanath |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0077909 A1 | 4/2006 | Saleh et al. |
| 2006/0080733 A1 | 4/2006 | Khosmood et al. |
| 2006/0095968 A1 | 5/2006 | Portolani et al. |
| 2006/0101516 A1* | 5/2006 | Sudaharan .......... H04L 63/0263 726/23 |
| 2006/0143432 A1 | 6/2006 | Rothman et al. |
| 2006/0156408 A1 | 7/2006 | Himberger et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0025306 A1 | 2/2007 | Cox et al. |
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0127491 A1 | 6/2007 | Verzijp et al. |
| 2007/0162420 A1 | 7/2007 | Ou et al. |
| 2007/0169179 A1 | 7/2007 | Narad |
| 2007/0195729 A1 | 8/2007 | Li et al. |
| 2007/0195794 A1 | 8/2007 | Fujita et al. |
| 2007/0201474 A1 | 8/2007 | Isobe |
| 2007/0211637 A1 | 9/2007 | Mitchell |
| 2007/0214348 A1 | 9/2007 | Danielsen |
| 2007/0230415 A1 | 10/2007 | Malik |
| 2007/0250930 A1 | 10/2007 | Aziz et al. |
| 2007/0300061 A1 | 12/2007 | Kim et al. |
| 2008/0022385 A1 | 1/2008 | Crowell et al. |
| 2008/0046708 A1 | 2/2008 | Fitzgerald et al. |
| 2008/0082662 A1 | 4/2008 | Danliker et al. |
| 2008/0101234 A1* | 5/2008 | Nakil .................. H04L 63/1425 370/235 |
| 2008/0120350 A1 | 5/2008 | Grabowski et al. |
| 2008/0126534 A1 | 5/2008 | Mueller et al. |
| 2008/0155245 A1 | 6/2008 | Lipscombe et al. |
| 2008/0250122 A1 | 10/2008 | Zsigmond et al. |
| 2008/0270199 A1 | 10/2008 | Chess et al. |
| 2008/0295163 A1 | 11/2008 | Kang |
| 2008/0301765 A1 | 12/2008 | Nicol et al. |
| 2009/0059934 A1 | 3/2009 | Aggarwal et al. |
| 2009/0064332 A1 | 3/2009 | Porras et al. |
| 2009/0241170 A1 | 9/2009 | Kumar et al. |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0157809 A1* | 6/2010 | Duffield .................. H04L 43/024 370/241 |
| 2010/0180016 A1 | 7/2010 | Bugwadia et al. |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0287266 A1 | 11/2010 | Asati et al. |
| 2010/0303240 A1 | 12/2010 | Beachem |
| 2010/0319060 A1 | 12/2010 | Aiken et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0083125 A1 | 4/2011 | Komatsu et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0246663 A1 | 10/2011 | Melsen et al. |
| 2011/0277034 A1 | 11/2011 | Hanson |
| 2011/0302652 A1 | 12/2011 | Westerfeld |
| 2011/0314148 A1 | 12/2011 | Petersen et al. |
| 2012/0005542 A1 | 1/2012 | Petersen et al. |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0117226 A1 | 5/2012 | Tanaka et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |

(56) References Cited

U.S. PATENT DOCUMENTS

| | | |
|---|---|---|
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0033193 A1 | 1/2014 | Palaniappan |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0280499 A1 | 9/2014 | Basavaiah et al. |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0317278 A1 | 10/2014 | Kersch et al. |
| 2014/0317737 A1 | 10/2014 | Shin et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006714 A1 | 1/2015 | Jain |
| 2015/0009840 A1 | 1/2015 | Pruthi et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0058976 A1 | 2/2015 | Carney et al. |
| 2015/0067143 A1 | 3/2015 | Babakhan et al. |
| 2015/0082151 A1 | 3/2015 | Liang et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | Mackay et al. |
| 2015/0295945 A1 | 10/2015 | Canzanese, Jr. et al. |
| 2015/0347554 A1 | 12/2015 | Vasantham et al. |
| 2015/0358352 A1 | 12/2015 | Chasin et al. |
| 2016/0006753 A1* | 1/2016 | McDaid .............. H04L 63/1425 726/23 |
| 2016/0019030 A1 | 1/2016 | Shukla et al. |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0103692 A1 | 4/2016 | Guntaka et al. |
| 2016/0105350 A1 | 4/2016 | Greifeneder et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0218933 A1* | 7/2016 | Porras .................. H04L 63/20 |
| 2016/0269442 A1 | 9/2016 | Shieh |
| 2016/0269482 A1 | 9/2016 | Jamjoom et al. |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |

(56) References Cited

U.S. PATENT DOCUMENTS

| | | |
|---|---|---|
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2017/0024453 A1 | 1/2017 | Raja et al. |
| 2017/0034018 A1 | 2/2017 | Parasdehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0145906 A1 | 5/2018 | Yadav et al. |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2016/004075 | 1/2016 |
| WO | WO 2016/019523 | 2/2016 |

OTHER PUBLICATIONS

Breen, Christopher, "MAC 911, How to dismiss Mac App Store Notifications," Macworld.com, Mar. 24, 2014, 3 pages.
Chou, C.W., et al., "Optical Clocks and Relativity," Science vol. 329, Sep. 24, 2010, pp. 1630-1633.
Huang, Hing-Jie, et al., "Clock Skew Based Node Identification in Wireless Sensor Networks," IEEE, 2008, 5 pages.
Ives, Herbert, E., et al., "An Experimental Study of the Rate of a Moving Atomic Clock," Journal of the Optical Society of America, vol. 28, No. 7, Jul. 1938, pp. 215-226.
Witze, Alexandra, "Special relativity aces time trial, 'Time dilation' predicted by Einstein confirmed by lithium ion experiment," Nature, Sep. 19, 2014, 3 pages.
Zatrochova, Zuzana, "Analysis and Testing of Distributed NoSQL Datastore Riak," Spring, 2015, 76 pages.
Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.
Author Unknown, "Blacklists & Dynamic Reputation: Understanding Why the Evolving Threat Eludes Blacklists," www.dambaia.com, 9 pages, Dambala, Atlanta, GA, USA.
Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.
Backes, Michael, et al., "Data Lineage in Malicious Environments," IEEE 2015, pp. 1-13.
Bayati, Mohsen, et al., "Message-Passing Algorithms for Sparse Network Alignment," Mar. 2013, 31 pages.
Berezinski, Przemyslaw, et al., "An Entropy-Based Network Anomaly Detection Method," Entropy, 2015, vol. 17, www.mdpi.com/journal/entropy, pp. 2367-2408.
Berthier, Robin, et al. "Nfsight: Netflow-based Network Awareness Tool," 2010, 16 pages.
Bhuyan, Dhiraj, "Fighting Bots and Botnets," 2006, pp. 23-28.
Blair, Dana, et al., U.S. Appl. No. 62/106,006, tiled Jan. 21, 2015, entitled "Monitoring Network Policy Compliance."
Chandran, Midhun, et al., "Monitoring in a Virtualized Environment," GSTF International Journal on Computing, vol. 1, No. 1, Aug. 2010.
Chari, Suresh, et al., "Ensuring continuous compliance through reconciling policy with usage," Proceedings of the 18th ACM symposium on Access control models and technologies (SACMAT '13). ACM, New York, NY, USA, 49-60.
Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.
Cisco Systems, "Cisco Network Analysis Modules (NAM) Tutorial," Cisco Systems, Inc., Version 3.5.
Cisco Systems, Inc., "Addressing Compliance from One Infrastructure: Cisco Unified Compliance Solution Framework," 2014.
Cisco Systems, Inc., "Cisco Application Dependency Mapping Service," 2009.
Cisco Systems, Inc., "White Paper—New Cisco Technologies Help Customers Achieve Regulatory Compliance," 1992-2008.
Cisco Systems, Inc., "A Cisco Guide to Defending Against Distributed Denial of Service Attacks," May 3, 2016, 34 pages.
Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.

(56) References Cited

OTHER PUBLICATIONS

Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.

Feinstein, Laura, et al., "Statistical Approaches to DDoS Attack Detection and Response," Proceedings of the DARPA Information Survivability Conference and Exposition (DISCEX '03), Apr. 2003, 12 pages.

George, Ashley, et al., "NetPal: A Dynamic Network Administration Knowledge Base," 2008, pp. 1-14.

Goldsteen, Abigail, et al., "A Tool for Monitoring and Maintaining System Trustworthiness at Run Time," REFSQ (2015), pp. 142-147.

Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.

Hewlett-Packard, "Effective use of reputation intelligence in a security operations center," Jul. 2013, 6 pages.

Hideshima, Yusuke, et al., "STARMINE: A Visualization System for Cyber Attacks," https://www.researchgate.net/publication/221536306, Feb. 2006, 9 pages.

InternetPerils, Inc., "Control Your Internet Business Risk," 2003-2015, https://www.internetperils.com.

Janoff, Christian, et al., "Cisco Compliance Solution for HIPAA Security Rule Design and Implementation Guide," Cisco Systems, Inc., Updated Nov. 14, 2015, part 1 of 2, 350 pages.

Janoff, Christian, et al., "Cisco Compliance Solution for HIPAA Security Rule Design and Implementation Guide," Cisco Systems, Inc., Updated Nov. 14, 2015, part 2 of 2, 588 pages.

Kerrison, Adam, et al., "Four Steps to Faster, Better Application Dependency Mapping—Laying the Foundation for Effective Business Service Models," BMCSoftware, 2011.

Kraemer, Brian, "Get to know your data center with CMDB," TechTarget, Apr. 5, 2006, http://searchdatacenter.techtarget.com/news/118820/Get-to-know-your-data-center-with-CMDB.

Lab Sku, "VMware Hands-on Labs—HOL-SDC-1301" Version: Mar. 21, 2014-160709, 2013; http://docs.hol.vmware.com/HOL-2013/holsdc-1301_html_en/ (part 1 of 2).

Lab SKU, "VMware Hands-on Labs—HOL-SDC-1301" Version: Mar. 21, 2014-160709, 2013; http://docs.hol.vmware.com/HOL-2013/holsdc-1301_html_en/ (part 2 of 2).

Lachance, Michael, "Dirty Little Secrets of Application Dependency Mapping," Dec. 26, 2007.

Landman, Yoav, et al., "Dependency Analyzer," Feb. 14, 2008, http://jfrog.com/confluence/display/DA/Home.

Lee, Sihyung, "Reducing Complexity of Large-Scale Network Configuration Management," Ph.D. Dissertation, Carniege Mellon University, 2010.

Li, Ang, et al., "Fast Anomaly Detection for Large Data Centers," Global Telecommunications Conference (GLOBECOM 2010, Dec. 2010, 6 pages.

Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.

Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.

Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.

Matteson, Ryan, "Depmap: Dependency Mapping of Applications Using Operating System Events: a Thesis," Master's Thesis, California Polytechnic State University, Dec. 2010.

Natarajan, Arun, et al., "NSDMiner: Automated Discovery of Network Service Dependencies," Institute of Electrical and Electronics Engineers INFOCOM, Feb. 2012, 9 pages.

Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.

Neverfail, "Neverfail IT Continuity Architect," https://web.archive.org/web/20150908090456/http://www.neverfailgroup.com/products/it-continuity-architect.

Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.

Nunnally, Troy, et al., "P3D: A Parallel 3D Coordinate Visualization for Advanced Network Scans," IEEE 2013, Jun. 9-13, 2013, 6 pages.

O'Donnell, Glenn, et al., "The CMDB Imperative: How to Realize the Dream and Avoid the Nightmares," Prentice Hall, Feb. 19, 2009.

Ohta, Kohei, et al., "Detection, Defense, and Tracking of Internet-Wide Illegal Access in a Distributed Manner," 2000, pp. 1-16.

Pathway Systems International Inc., "How Blueprints does Integration," Apr. 15, 2014, 9 pages, http://pathwaysystems.com/company-blog/.

Pathway Systems International Inc., "What is Blueprints?" 2010-2016, http://pathwaysystems.com/blueprints-about/.

Popa, Lucian, et al., "Macroscope: End-Point Approach to Networked Application Dependency Discovery," CoNEXT'09, Dec. 1-4, 2009, Rome, Italy, 12 pages.

Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.

Sachan, Mrinmaya, et al., "Solving Electrical Networks to incorporate Supervision in Random Walks," May 13-17, 2013, pp. 109-110.

Sammarco, Matteo, et al., "Trace Selection for Improved WLAN Monitoring," Aug. 16, 2013, pp. 9-14.

Shneiderman, Ben, et al., "Network Visualization by Semantic Substrates," Visualization and Computer Graphics, vol. 12, No. 5, pp. 733,740, Sep.-Oct. 2006.

Wang, Ru, et al., "Learning directed acyclic graphs via bootstarp aggregating," 2014, 47 pages, http://arxiv.org/abs/1406.2098.

Wang, Yongjun, et al., "A Network Gene-Based Framework for Detecting Advanced Persistent Threats," Nov. 2014, 7 pages.

Woodberg, Brad, "Snippet from Juniper SRX Series" Jun. 17, 2013, 1 page, O'Reilly Media, Inc.

Zhang, Yue, et al., "CANTINA: A Content-Based Approach to Detecting Phishing Web Sites," May 8-12, 2007, pp. 639-648.

Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.

Brocade Communications Systems, Inc., "Chapter 5—Configuring Virtual LANs (VLANs)," Jun. 2009, 38 pages.

Cisco Systems, Inc. "Cisco, Nexus 3000 Series NX-OS Release Notes, Release 5.0(3)U3(1)," Feb. 29, 2012, Part No. OL-26631-01, 16 pages.

Cisco Systems, Inc., "Cisco—VPN Client User Guide for Windows," Release 4.6, Aug. 2004, 148 pages.

Cisco Systems, Inc., "Cisco 4710 Application Control Engine Appliance Hardware Installation Guide," Nov. 2007, 66 pages.

Cisco Systems, Inc., "Cisco Data Center Network Architecture and Solutions Overview," Feb. 2006, 19 pages.

Cisco Systems, Inc., "Cisco IOS Configuration Fundamentals Configuration Guide: *Using Autoinstall and Setup*," Release 12.2, first published Apr. 2001, last updated Sep. 2003, 32 pages.

Cisco Systems, Inc., "Cisco VN-Link: Virtualization-Aware Networking," White Paper, Mar. 2009, 10 pages.

Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.

Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.

(56) References Cited

OTHER PUBLICATIONS

Cisco Systems, Inc., "Quick Start Guide, Cisco ACE 4700 Series Application Control Engine Appliance," Software Ve740rsion A5(1.0), Sep. 2011, 138 pages.
Cisco Systems, Inc., "Routing and Bridging Guide, Cisco ACE Application Control Engine," Software Version A5(1.0), Sep. 2011, 248 pages.
Cisco Systems, Inc., "VMWare and Cisco Virtualization Solution: Scale Virtual Machine Networking," Jul. 2009, 4 pages.
Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.
Cisco Technology, Inc., "Cisco IOS Software Release 12.4T Features and Hardware Support," Feb. 2009, 174 pages.
Cisco Systems, Inc., "Cisco Application Control Engine (ACE) Troubleshooting Guide—Understanding the ACE Module Architecture and Traffic Flow," Mar. 11, 2011, 6 pages.
Costa, Raul, et al., "An Intelligent Alarm Management System for Large-Scale Telecommunication Companies," In Portuguese Conference on Artificial Intelligence, Oct. 2009, 14 pages.
De Carvalho, Tiago Filipe Rodrigues, Dec. 2008, "Root Cause Analysis in Large and Complex Networks," Dec. 2008, Repositorio.ul.pt, pp. 1-55.
Foundation for Intelligent Physical Agents, "FIPA Agent Message Transport Service Specification," Dec. 3, 2002, http://www.fipa.org; 15 pages.
Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Online Collins English Dictionary, 1 page (Year: 2018).
Voris, Jonathan, et al., "Bait and Snitch: Defending Computer Systems with Decoys," Columbia University Libraries, Department of Computer Science, 2013, pp. 1-25.
Bauch, Petr, "Reader's Report of Master's Thesis, Analysis and Testing of Distributed NoSQL Datastore Riak," May 28, 2015, Brno. 2 pages.
Heckman, Sarah, et al., "On Establishing a Benchmark for Evaluating Static Analysis Alert Prioritization and Classification Techniques," IEEE, 2008; 10 pages.
Kim, Myung-Sup, et al. "A Flow-based Method for Abnormal Network Traffic Detection, " IEEE, 2004, pp. 599-612.
Thomas, R., "Bogon Dotted Decimal List," Version 7.0, Team Cymru NOC, Apr. 27, 2012, 5 pages.

\* cited by examiner

SYSTEM AND METHOD OF DETECTING HIDDEN PROCESSES BY ANALYZING PACKET FLOWS

CROSS-REFERENCE TO RELATED APPLICATIONS

This application claims priority to U.S. Provisional Application No. 62/171,899, entitled "SYSTEM FOR MONITORING AND MANAGING DATACENTERS," filed on Jun. 5, 2015, which is incorporated herein by reference in its entirety.

TECHNICAL FIELD

The present disclosure pertains to network analytics, and more specifically a system for detecting hidden processes within a network by analyzing data captured by sensors deployed at multiple layers throughout the network.

BACKGROUND

Network traffic produced by a compute environment (whether from a container, VM, hardware switch, hypervisor or physical server) is captured by entities called sensors or capture agents that can be deployed in or inside different environments as mentioned herein. Sensors export data or metadata of the observed network activity to collection agents called "collectors." Collectors can be a group of processes running on a single machine or a cluster of machines. For the sake of simplicity, all collectors are treated as one logical entity and referred to as one collector. In actual deployment on a datacenter scale, there will be more than just one collector, each responsible for handling export data from a group of sensors. Collectors are capable of doing preprocessing and analysis of the data collected from sensors. A collector is capable of sending the processed or unprocessed data to a cluster of processes responsible for analysis of network data. The entities which receive the data from collector can be a cluster of processes, which logical group can be referred to as a pipeline. Note that sensors and collectors are not limited to observing and processing just network data, but can also capture other system information like currently active processes, active file handles, socket handles, status of I/O devices, memory, etc.

There are deficiencies in the current use of collectors and sensors. Various techniques are used to hide the presence of malware and the network traffic generated by malware. Network traffic generated by a malware or any agent that wishes to send data out of the system can do so by placing itself at various levels in the Operating System (OS) stack. Data can be sent out by various means, some of which can bypass the OS stack altogether. For example, a compromised network device driver or firmware can send data out without being detected by the OS (either Guest or Host OS in a virtualized environment). Sometimes, a compromised device or service can generate and send packets which hide a process used by the malware which may otherwise indicate the system is compromised via the process). Network traffic can often be detected by analyzing packets on the wire or the physical medium. A packet analyzer system (hardware or software) placed on the wire can see all packets, but has no means for identifying a process in a packet if the process is hidden from the host OS, making it difficult to identify processes used or attacked by malware. Precisely, a packet analyzer cannot identify a hidden process when a portion of the flow associated with the process is hidden.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
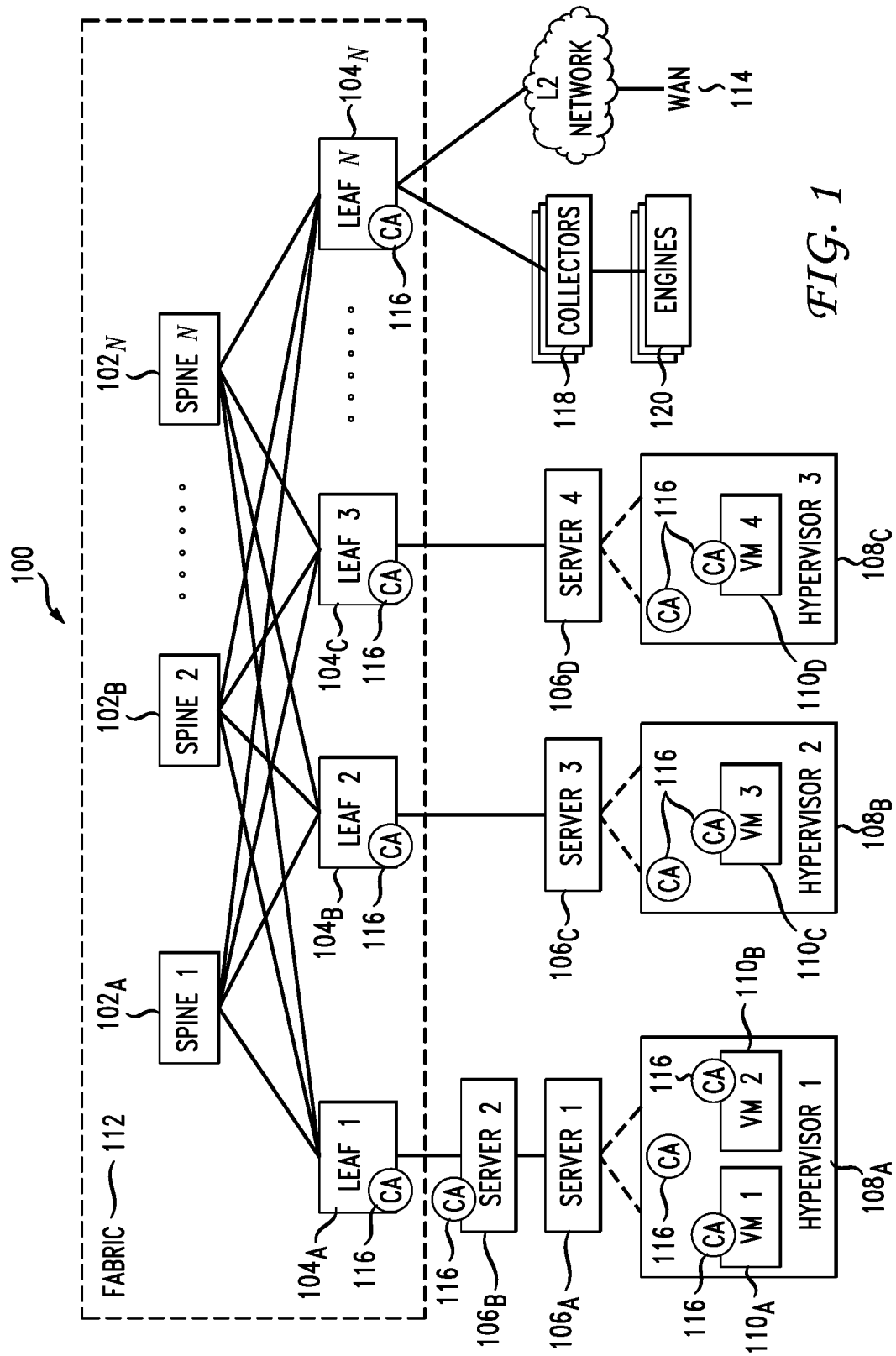
FIG. 1 illustrates a diagram of an example network environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

It is advantageous to identify the amount of packet loss at each point in a network and to fine tune and improve the network. Prior art solutions noted above implement a request/reply model when trying to identify packet loss at different points. However, unlike the concepts disclosed herein, the prior model cannot be implemented in a live environment. Moreover, the model is not as efficient or accurate as the concepts disclosed herein. The present disclosure provides systems that detect malicious activity by capturing data associated with a packet flow from a location within the host generating the packet flow as well as capturing second data associated with the packet flow from a second host. The sets of data are compared to identify a hidden process in the packets by comparing the processes associated with the first data and the processes associated with the second data.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for capturing first data associated with a first packet flow originating from a computing device (a first host) using a first capture agent deployed at the computing device to yield first flow data, capturing second data associated with a second packet flow originating from the computing device from a second capture agent deployed outside of the computing device (i.e., on a second host) to yield second flow data and comparing the first flow data and the second flow data to yield a difference. When the difference is above a threshold value, the method includes determining that a hidden process exists. The first data and the second data can include metadata associated respectively with the first packet flow and the second packet flow, network data or packet content data. The first flow data and the second flow data are preferably captured at a collector. The collector receives the first flow data and the second flow data and performs the step of comparing the first flow data and the second flow data.

Based on the comparison, the system can identify the computing device or host as a generator of the hidden process. The system could also identify a different compute environment as the source of the hidden process. Based on the comparison or the determination, the system can perform the step of predicting a presence of a malicious entity within the computing device or host. The system can also take a corrective action such as one or more of: isolating a virtual machine, isolating a container, limiting packets to and from the computing device, requiring all packets to and from the computing device to flow through an operating stack of the computing device, isolating the computing device, shutting down the computing device, blacklisting the hidden network traffic and/or any entities associated with the hidden network traffic such as a sender or source, tagging or flagging the hidden network traffic, adjusting the granularity of reported or captured data associated with the hidden network traffic or an associated entity, adjusting a network or security policy such as a routing or firewall policy, and notifying an administrator. The "computing device" can be any host or component, physical or virtual, in the network.

Description

The present disclosure addresses the need in the art for identifying malicious processes within a network. This disclosure provides a method and system of detecting a hidden process in a packet by observing traffic from two or more reference points. One of the reference points is the system X where the traffic was generated and the other reference point is a system Y through which all network traffic of system X must pass. The system detects such packets by collecting metadata of packets or the packet content itself that was seen at both reference point X and reference point Y, and computing the difference between them. The system identifies the hidden process by comparing the processes in the packets captured by system X with those captured by system Y. This methodology and system can detect such packets in a datacenter having different kinds of compute workloads ranging from containers, virtual machines, hypervisors, switches, and bare metal servers.

A description of an example network environment, as illustrated in FIG. 1, is first disclosed herein. A discussion of capturing agents will then follow. The disclosure continues with a discussion of the specific process for identifying a lineage for a process or processes and then determining through the study of the lineage whether a process is malicious. The discussion then concludes with a description of example systems and devices. These variations shall be described herein as the various embodiments are set forth. The disclosure now turns to FIG. 1.

FIG. 1 illustrates a diagram of example network environment 100. Fabric 112 can represent the underlay (i.e., physical network) of network environment 100. Fabric 112 can include spine routers 1-N ($102_{A-N}$) (collectively "102") and leaf routers 1-N ($104_{A-N}$) (collectively "104"). Leaf routers 104 can reside at the edge of fabric 112, and can thus represent the physical network edges. Leaf routers 104 can be, for example, top-of-rack ("ToR") switches, aggregation switches, gateways, ingress and/or egress switches, provider edge devices, and/or any other type of routing or switching device.

Leaf routers 104 can be responsible for routing and/or bridging tenant or endpoint packets and applying network policies. Spine routers 102 can perform switching and routing within fabric 112. Thus, network connectivity in fabric 112 can flow from spine routers 102 to leaf routers 104, and vice versa.

Leaf routers 104 can provide servers 1-4 ($106_{A-D}$) (collectively "106"), hypervisors 1-3 ($108_A$-$108_C$) (collectively "108"), virtual machines (VMs) 1-4 ($110_A$-$110_D$) (collectively "110"), collectors 118, engines 120, and the Layer 2 (L2) network access to fabric 112. For example, leaf routers 104 can encapsulate and decapsulate packets to and from servers 106 in order to enable communications throughout environment 100. Leaf routers 104 can also connect other network-capable device(s) or network(s), such as a firewall, a database, a server, etc., to the fabric 112. Leaf routers 104 can also provide any other servers, resources, endpoints, external networks, VMs, services, tenants, or workloads with access to fabric 112.

VMs 110 can be virtual machines hosted by hypervisors 108 running on servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on servers 106, and the hardware resources on servers 106 to appear as multiple, separate hardware platforms. Moreover, hypervisors 108 and servers 106 can host one or more VMs 110. For example, server $106_A$ and hypervisor $108_A$ can host VMs $110_{A-B}$.

In some cases, VMs 110 and/or hypervisors 108 can be migrated to other servers 106. For example, VM $110_A$ can be migrated to server $106_C$ and hypervisor $108_B$. Servers 106 can similarly be migrated to other locations in network environment 100. For example, a server connected to a specific leaf router can be changed to connect to a different or additional leaf router. In some cases, some or all of servers 106, hypervisors 108, and/or VMs 110 can represent tenant space. Tenant space can include workloads, services, applications, devices, and/or resources that are associated with one or more clients or subscribers. Accordingly, traffic in network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

Any of leaf routers 104, servers 106, hypervisors 108, and VMs 110 can include capturing agent 116 (also referred to as a "sensor" or a "capturing agent") configured to capture network data, and report any portion of the captured data to collector 118. Capturing agents 116 can be processes, agents, modules, drivers, or components deployed on a respective system or system layer (e.g., a server, VM, virtual container, hypervisor, leaf router, etc.), configured to capture network data for the respective system (e.g., data received or transmitted by the respective system), and report some or all of the captured data and statistics to collector 118.

For example, a VM capturing agent can run as a process, kernel module, software element, or kernel driver on the guest operating system installed in a VM and configured to capture and report data (e.g., network and/or system data) processed (e.g., sent, received, generated, etc.) by the VM.

A hypervisor capturing agent can run as a process, kernel module, software element, or kernel driver on the host operating system installed at the hypervisor layer and configured to capture and report data (e.g., network and/or system data) processed (e.g., sent, received, generated, etc.) by the hypervisor.

A container capturing agent can run as a process, kernel module, software element, or kernel driver on the operating system of a device, such as a switch or server, which can be configured to capture and report data processed by the container.

A server capturing agent can run as a process, kernel module, software element, or kernel driver on the host operating system of a server and configured to capture and report data (e.g., network and/or system data) processed (e.g., sent, received, generated, etc.) by the server.

A network device capturing agent can run as a process, software element, or component in a network device, such as leaf routers 104, and configured to capture and report data (e.g., network and/or system data) processed (e.g., sent, received, generated, etc.) by the network device.

Capturing agents 116 can be configured to report observed data, statistics, and/or metadata about one or more packets, flows, communications, processes, events, and/or activities to collector 118. For example, capturing agents 116 can capture network data and statistics processed (e.g., sent, received, generated, dropped, forwarded, etc.) by the system or host (e.g., server, hypervisor, VM, container, switch, etc.) of the capturing agents 116 (e.g., where the capturing agents 116 are deployed). The capturing agents 116 can also report the network data and statistics to one or more devices, such as collectors 118 and/or engines 120. For example, the capturing agents 116 can report an amount of traffic processed by their host, a frequency of the traffic processed by their host, a type of traffic processed (e.g., sent, received, generated, etc.) by their host, a source or destination of the traffic processed by their host, a pattern in the traffic, an amount of traffic dropped or blocked by their host, types of requests or data in the traffic received, discrepancies in traffic (e.g., spoofed addresses, invalid addresses, hidden sender, etc.), protocols used in communications, type or characteristics of responses to traffic by the hosts of the capturing agents 116, what processes have triggered specific packets, etc.

Capturing agents 116 can also capture and report information about the system or host of the capturing agents 116 (e.g., type of host, type of environment, status of host, conditions of the host, etc.). Such information can include, for example, data or metadata of active or previously active processes of the system, operating system user identifiers, kernel modules loaded or used, network software characteristics (e.g., software switch, virtual network card, etc.), metadata of files on the system, system alerts, number and/or identity of applications at the host, domain information, networking information (e.g., address, topology, settings, connectivity, etc.), session information (e.g., session identifier), faults or errors, memory or CPU usage, threads, filename and/or path, services, security information or settings, and so forth.

Capturing agents 116 may also analyze the processes running on the respective VMs, hypervisors, servers, or network devices to determine specifically which process is responsible for a particular flow of network traffic. Similarly, capturing agents 116 may determine which operating system user (e.g., root, system, John Doe, Admin, etc.) is responsible for a given flow. Reported data from capturing agents 116 can provide details or statistics particular to one or more tenants or customers. For example, reported data from a subset of capturing agents 116 deployed throughout devices or elements in a tenant space can provide information about the performance, use, quality, events, processes, security status, characteristics, statistics, patterns, conditions, configurations, topology, and/or any other information for the particular tenant space.

Collectors 118 can be one or more devices, modules, workloads, VMs, containers, and/or processes capable of receiving data from capturing agents 116. Collectors 118 can thus collect reports and data from capturing agents 116. Collectors 118 can be deployed anywhere in network environment 100 and/or even on remote networks capable of communicating with network environment 100. For example, one or more collectors can be deployed within fabric 112, on the L2 network, or on one or more of the servers 106, VMs 110, hypervisors. Collectors 118 can be hosted on a server or a cluster of servers, for example. In some cases, collectors 118 can be implemented in one or more servers in a distributed fashion.

As previously noted, collectors 118 can include one or more collectors. Moreover, a collector can be configured to receive reported data from all capturing agents 116 or a subset of capturing agents 116. For example, a collector can be assigned to a subset of capturing agents 116 so the data received by that specific collector is limited to data from the subset of capturing agents 116. Collectors 118 can be configured to aggregate data from all capturing agents 116 and/or a subset of capturing agents 116. Further, collectors 118 can be configured to analyze some or all of the data reported by capturing agents 116.

Environment 100 can include one or more analytics engines 120 configured to analyze the data reported to collectors 118. For example, engines 120 can be configured to receive collected data from collectors 118, aggregate the data, analyze the data (individually and/or aggregated), generate reports, identify conditions, compute statistics, visualize reported data, troubleshoot conditions, visualize the network and/or portions of the network (e.g., a tenant space), generate alerts, identify patterns, calculate misconfigurations, identify errors, generate suggestions, generate testing, detect compromised elements (e.g., capturing agents 116, devices, servers, switches, etc.), and/or perform any other analytics functions.

Engines 120 can include one or more modules or software programs for performing such analytics. Further, engines 120 can reside on one or more servers, devices, VMs, nodes, etc. For example, engines 120 can be separate VMs or servers, an individual VM or server, or a cluster of servers or applications. Engines 120 can reside within the fabric 112, within the L2 network, outside of the environment 100 (e.g., WAN 114), in one or more segments or networks coupled with the fabric 112 (e.g., overlay network coupled with the fabric 112), etc. Engines 120 can be coupled with the fabric 112 via the leaf switches 104, for example.

While collectors 118 and engines 120 are shown as separate entities, this is simply a non-limiting example for illustration purposes, as other configurations are also contemplated herein. For example, any of collectors 118 and engines 120 can be part of a same or separate entity. Moreover, any of the collector, aggregation, and analytics functions can be implemented by one entity (e.g., a collector 118 or engine 120) or separately implemented by multiple entities (e.g., engines 120 and/or collectors 118).

Each of the capturing agents 116 can use a respective address (e.g., internet protocol (IP) address, port number, etc.) of their host to send information to collectors 118 and/or any other destination. Collectors 118 may also be associated with their respective addresses such as IP addresses. Moreover, capturing agents 116 can periodically send information about flows they observe to collectors 118. Capturing agents 116 can be configured to report each and every flow they observe or a subset of flows they observe. For example, capturing agents 116 can report every flow always, every flow within a period of time, every flow at one or more intervals, or a subset of flows during a period of time or at one or more intervals.

Capturing agents 116 can report a list of flows that were active during a period of time (e.g., between the current time and the time of the last report). The consecutive periods of time of observance can be represented as pre-defined or adjustable time series. The series can be adjusted to a specific level of granularity. Thus, the time periods can be adjusted to control the level of details in statistics and can be customized based on specific requirements or conditions, such as security, scalability, bandwidth, storage, etc. The time series information can also be implemented to focus on more important flows or components (e.g., VMs) by varying the time intervals. The communication channel between a capturing agent and collector 118 can also create a flow in every reporting interval. Thus, the information transmitted or reported by capturing agents 116 can also include information about the flow created by the communication channel.

When referring to a capturing agent's host herein, the host can refer to the physical device or component hosting the capturing agent server, networking device, ASIC, etc.), the virtualized environment hosting the capturing agent (e.g., hypervisor, virtual machine, etc.), the operating system hosting the capturing agent (e.g., guest operating system, host operating system, etc.), and/or system layer hosting the capturing agent (e.g., hardware layer, operating system layer, hypervisor layer, virtual machine layer, etc.).

Figure 2A:
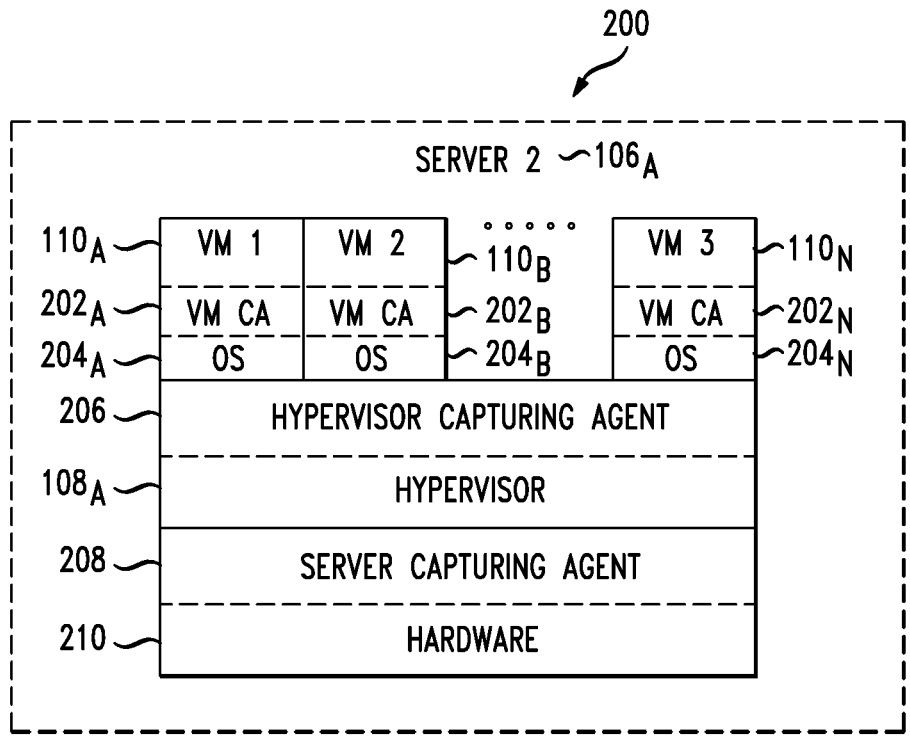
FIG. 2A illustrates a schematic diagram of an example capturing agent deployment a virtualized environment.

FIG. 2A illustrates a schematic diagram of an example capturing agent deployment 200 in a server 106$_A$. Server 106$_A$ can execute and host one or more VMs 110$_{A-N}$ (collectively "110"). VMs 110 can be configured to run workloads (e applications, services, processes, functions, etc.) based on hardware resources 210 on server 106$_A$. VMs 110 can run on guest operating systems 204$_{A-N}$ (collectively "204") on a virtual operating platform provided by hypervisor 108$_A$. Each VM 110 can run a respective guest operating system 204 which can be the same or different as other guest operating systems 204 associated with other VMs 110 on server 106$_A$. Each of guest operating systems 204 can execute one or more processes, which may in turn be programs, applications, modules, drivers, services, widgets, etc. Moreover, each VM 110 can have one or more network addresses, such as an internet protocol (IP) address. VMs 110 can thus communicate with hypervisor 108$_A$, server 106$_A$, and/or any remote devices or networks using the one or more network addresses.

Hypervisor 108$_A$ (otherwise known as a virtual machine manager or monitor) can be a layer of software, firmware, and/or hardware that creates and runs VMs 110. Guest operating systems 204 running on VMs 110 can share virtualized hardware resources created by hypervisor 108$_A$. The virtualized hardware resources can provide the illusion of separate hardware components. Moreover, the virtualized hardware resources can perform as physical hardware components (e.g., memory, storage, processor, network interface, peripherals, etc.), and can be driven by hardware resources 210 on server 106$_A$. Hypervisor 108$_A$ can have one or more network addresses, such as an internet protocol (IP) address, to communicate with other devices, components, or networks. For example, hypervisor 108$_A$ can have a dedicated IP address which it can use to communicate with VMs 110, server 106$_A$, and/or any remote devices or networks.

Hypervisor 108$_A$ can be assigned a network address, such as an IP, with a global scope. For example, hypervisor 108$_A$ can have an IP that can be reached or seen by VMs 110$_{A-N}$ as well any other devices in the network environment 100 illustrated in FIG. 1. On the other hand. VMs 110 can have a network address, such as an IP, with a local scope. For example, VM 110$_A$ can have an IP that is within a local network segment where VM 110$_A$ resides and/or which may not be directly reached or seen from other network segments in the network environment 100.

Hardware resources 210 of server 106$_A$ can provide the underlying physical hardware that drive operations and functionalities provided by server 106$_A$, hypervisor 108$_A$, and VMs 110. Hardware resources 210 can include, for example, one or more memory resources, one or more storage resources, one or more communication interfaces, one or more processors, one or more circuit boards, one or more buses, one or more extension cards, one or more power supplies, one or more antennas, one or more peripheral components, etc.

Server 106$_A$ can also include one or more host operating systems (not shown). The number of host operating systems can vary by configuration. For example, some configurations can include a dual boot configuration that allows server 106$_A$ to boot into one of multiple host operating systems. In other configurations, server 106$_A$ may run a single host operating system. Host operating systems can run on hardware resources 210. In some cases, hypervisor 108$_A$ can run on, or utilize, a host operating system on server 106$_A$. Each of the host operating systems can execute one or more processes, which may be programs, applications, modules, drivers, services, widgets, etc.

Server 106$_A$ can also have one or more network addresses, such as an IP address, to communicate with other devices, components, or networks. For example, server 106$_A$ can have an IP address assigned to a communications interface from hardware resources 210, which it can use to communicate with VMs 110, hypervisor 108$_A$, leaf router 104$_A$ in FIG. 1, collectors 118 in FIG. 1, and/or any remote devices or networks.

VM capturing agents 202$_{A-N}$ (collectively "202") can be deployed on one or more of VMs 110. VM capturing agents 202 can be data and packet inspection agents or sensors deployed on VMs 110 to capture packets, flows, processes, events, traffic, and/or any data flowing into, out of, or through VMs 110. VM capturing agents 202 can be configured to export or report any data collected or captured by the capturing agents 202 to a remote entity, such as collectors 118, for example. VM capturing agents 202 can communicate or report such data using a network address of the respective VMs 110 VM IP address).

VM capturing agents 202 can capture and report any traffic (e.g., packets, flows, etc.) sent, received, generated, and/or processed by VMs 110. For example, capturing agents 202 can report every packet or flow of communication sent and received by VMs 110. Such communication channel between capturing agents 202 and collectors 108 creates a flow in every monitoring period or interval and the flow generated by capturing agents 202 may be denoted as a control flow. Moreover, any communication sent or received by VMs 110, including data reported from capturing agents 202, can create a network flow. VM capturing agents 202 can report such flows in the form of a control flow to a remote device, such as collectors 118 illustrated in FIG. 1.

VM capturing agents 202 can report each flow separately or aggregated with other flows. When reporting a flow via a control flow, VM capturing agents 202 can include a capturing agent identifier that identifies capturing agents 202 as reporting the associated flow. VM capturing agents 202 can also include in the control flow a flow identifier, an IP address, a timestamp, metadata, a process ID, an OS username associated with the process ID, a host or environment descriptor (e.g., type of software bridge or virtual network card, type of host such as a hypervisor or VM, etc.), and any other information, as further described below. In addition, capturing agents 202 can append the process and user information (i.e., which process and/or user is associated with a particular flow) to the control flow. The additional information as identified above can be applied to the control how as labels. Alternatively, the additional information can be included as part of a header, a trailer, or a payload.

VM capturing agents 202 can also report multiple flows as a set of flows. When reporting a set of flows, VM capturing agents 202 can include a flow identifier for the set of flows and/or a flow identifier for each flow in the set of flows. VM capturing agents 202 can also include one or more timestamps and other information as previously explained.

VM capturing agents 202 can run as a process, kernel module, or kernel driver on guest operating systems 204 of VMs 110. VM capturing agents 202 can thus monitor any traffic sent, received, or processed by VMs 110, any processes running on guest operating systems 204, any users and user activities on guest operating system 204, any workloads on VMs 110, etc.

Hypervisor capturing agent 206 can be deployed on hypervisor $108_A$. Hypervisor capturing agent 206 can be a data inspection agent or sensor deployed on hypervisor $108_A$ to capture traffic (e.g., packets, flows, etc.) and/or data flowing through hypervisor $108_A$. Hypervisor capturing agent 206 can be configured to export or report any data collected or captured by hypervisor capturing agent 206 to a remote entity, such as collectors 118, for example. Hypervisor capturing agent 206 can communicate or report such data using a network address of hypervisor $108_A$, such as an IP address of hypervisor $108_A$.

Because hypervisor $108_A$ can see traffic and data originating from VMs 110, hypervisor capturing agent 206 can also capture and report any data (e.g., traffic data) associated with VMs 110. For example, hypervisor capturing agent 206 can report every packet or flow of communication sent or received by VMs 110 and/or VM capturing agents 202. Moreover, any communication sent or received by hypervisor $108_A$, including data reported from hypervisor capturing agent 206, can create a network flow. Hypervisor capturing agent 206 can report such flows in the form of a control flow to a remote device, such as collectors 118 illustrated in FIG. 1. Hypervisor capturing agent 206 can report each flow separately and/or in combination with other flows or data.

When reporting a flow, hypervisor capturing agent 206 can include a capturing agent identifier that identifies hypervisor capturing agent 206 as reporting the flow. Hypervisor capturing agent 206 can also include in the control flow a flow identifier, an IP address, a timestamp, metadata, a process ID, and any other information, as explained below. In addition, capturing agents 206 can append the process and user information (i.e., which process and/or user is associated with a particular flow) to the control flow. The additional information as identified above can be applied to the control flow as labels. Alternatively, the additional information can be included as part of a header, a trailer, or a payload.

Hypervisor capturing agent 206 can also report multiple flows as a set of flows. When reporting a set of flows, hypervisor capturing agent 206 can include a flow identifier for the set of flows and/or a flow identifier for each flow in the set of flows. Hypervisor capturing agent 206 can also include one or more timestamps and other information as previously explained, such as process and user information.

As previously explained, any communication captured or reported by VM capturing agents 202 can flow through hypervisor $108_A$. Thus, hypervisor capturing agent 206 can observe and capture any flows or packets reported by VM capturing agents 202, including any control flows. Accordingly, hypervisor capturing agent 206 can also report any packets or flows reported by VM capturing agents 202 and any control flows generated by VM capturing agents 202. For example, VM capturing agent $202_A$ on VM 1 ($110_A$) captures flow 1 ("F1") and reports F1 to collector 118 on FIG. 1. Hypervisor capturing agent 206 on hypervisor $108_A$ can also see and capture F1, as F1 would traverse hypervisor $108_A$ when being sent or received by VM 1 ($110_A$). Accordingly, hypervisor capturing agent 206 on hypervisor $108_A$ can also report F1 to collector 118. Thus, collector 118 can receive a report of F1 from VM capturing agent $202_A$ on VM 1 ($110_A$) and another report of F1 from hypervisor capturing agent 206 on hypervisor $108_A$.

When reporting F1, hypervisor capturing agent 206 can report F1 as a message or report that is separate from the message or report of F1 transmitted by VM capturing agent $202_A$ on VM 1 ($110_A$). However, hypervisor capturing agent 206 can also, or otherwise, report F1 as a message or report that includes or appends the message or report of F1 transmitted by VM capturing agent $202_A$ on VM 1 ($110_A$). In other words, hypervisor capturing agent 206 can report F1 as a separate message or report from VM capturing agent $202_A$'s message or report of F1, and/or a same message or report that includes both a report of F1 by hypervisor capturing agent 206 and the report of F1 by VM capturing agent $202_A$ at VM 1 ($110_A$). In this way, VM capturing agents 202 at VMs 110 can report packets or flows received or sent by VMs 110, and hypervisor capturing agent 206 at hypervisor $108_A$ can report packets or flows received or sent by hypervisor $108_A$, including any flows or packets received or sent by VMs 110 and/or reported by VM capturing agents 202.

Hypervisor capturing agent 206 can run as a process, kernel module, or kernel driver on the host operating system associated with hypervisor $108_A$. Hypervisor capturing agent 206 can thus monitor any traffic sent and received by hypervisor $108_A$, any processes associated with hypervisor $108_A$, etc.

Server 106$_A$ can also have server capturing agent 208 running on it. Server capturing agent 208 can be a data inspection agent or sensor deployed on server 106$_A$ to capture data (e.g., packets, flows, traffic data, etc.) on server 106$_A$. Server capturing agent 208 can be configured to export or report any data collected or captured by server capturing agent 206 to a remote entity, such as collector 118, for example. Server capturing agent 208 can communicate or report such data using a network address of server 106$_A$, such as an IP address of server 106$_A$.

Server capturing agent 208 can capture and report any packet or flow of communication associated with server 106$_A$. For example, capturing agent 208 can report every packet or flow of communication sent or received by one or more communication interfaces of server 106$_A$. Moreover, any communication sent or received by server 106$_A$, including data reported from capturing agents 202 and 206, can create a network flow associated with server 106$_A$. Server capturing agent 208 can report such flows in the form of a control flow to a remote device, such as collector 118 illustrated in FIG. 1. Server capturing agent 208 can report each flow separately or in combination. When reporting a flow, server capturing agent 208 can include a capturing agent identifier that identities server capturing agent 208 as reporting the associated flow. Server capturing agent 208 can also include in the control flow a flow identifier, an IP address, a timestamp, metadata, a process ID, and any other information. In addition, capturing agent 208 can append the process and user information (i.e., which process and/or user is associated with a particular flow) to the control flow. The additional information as identified above can be applied to the control flow as labels. Alternatively, the additional information can be included as part of a header, a trailer, or a payload.

Server capturing agent 208 can also report multiple flows as a set of flows. When reporting a set of flows, server capturing agent 208 can include a flow identifier for the set of flows and/or a flow identifier for each flow in the set of flows. Server capturing agent 208 can also include one or more timestamps and other information as previously explained.

Any communications captured or reported by capturing agents 202 and 206 can flow through server 106$_A$. Thus, server capturing agent 208 can observe or capture any flows or packets reported by capturing agents 202 and 206. In other words, network data observed by capturing agents 202 and 206 inside VMs 110 and hypervisor 108$_A$ can be a subset of the data observed by server capturing agent 208 on server 106$_A$. Accordingly, server capturing agent 208 can report any packets or flows reported by capturing agents 202 and 206 and any control flows generated by capturing agents 202 and 206. For example, capturing agent 202$_A$ on VM 1 (110$_A$) captures flow 1 (F1) and reports F1 to collector 118 as illustrated on FIG. 1. Capturing agent 206 on hypervisor 108$_A$ can also observe and capture F1, as F1 would traverse hypervisor 108$_A$ when being sent or received by VM 1 (110$_A$). In addition, capturing agent 206 on server 106$_A$ can also see and capture F1, as F1 would traverse server 106$_A$ when being sent or received by VM 1 (110$_A$) and hypervisor 108$_A$. Accordingly, capturing agent 208 can also report F1 to collector 118. Thus, collector 118 can receive a report (i.e., control flow) regarding F1 from capturing agent 202$_A$ on VM 1 (110$_A$), capturing agent 206 on hypervisor 108$_A$, and capturing agent 208 on server 106$_A$.

When reporting F1, server capturing agent 208 can report F1 as a message or report that is separate from any messages or reports of F1 transmitted by capturing agent 202$_A$ on VM 1 (110$_A$) or capturing agent 206 on hypervisor 108$_A$. However, server capturing agent 208 can also, or otherwise, report F1 as a message or report that includes or appends the messages or reports or metadata of E1 transmitted by capturing agent 202$_A$ on VM 1 (110$_A$) and capturing agent 206 on hypervisor 108$_A$. In other words, server capturing agent 208 can report F1 as a separate message or report from the messages or reports of F1 from capturing agent 202$_A$ and capturing agent 206, and/or a same message or report that, includes a report of F1 by capturing agent 202$_A$, capturing agent 206, and capturing agent 208. In this way, capturing agents 202 at VMs 110 can report packets or flows received or sent by VMs 110, capturing agent 206 at hypervisor 108$_A$ can report packets or flows received or sent by hypervisor 108$_A$, including any flows or packets received or sent by VMs 110 and reported by capturing agents 202, and capturing agent 208 at server 106$_A$ can report packets or flows received or sent by server 106$_A$, including any flows or packets received or sent by VMs 110 and reported by capturing agents 202, and any flows or packets received or sent by hypervisor 108$_A$ and reported by capturing agent 206.

Server capturing agent 208 can run as a process, kernel module, or kernel driver on the host operating system or a hardware component of server 106$_A$. Server capturing agent 208 can thus monitor any traffic sent and received by server 106$_A$, any processes associated with server 106$_A$, etc.

In addition to network data, capturing agents 202, 206, and 208 can capture additional information about the system or environment in which they reside. For example, capturing agents 202, 206, and 208 can capture data or metadata of active or previously active processes of their respective system or environment, operating system user identifiers, metadata of files on their respective system or environment, timestamps, network addressing information, flow identifiers, capturing agent identifiers, etc. Capturing agents 202, 206, and 208

Moreover, capturing agents 202, 206, 208 are not specific to any operating system environment, hypervisor environment, network environment, or hardware environment. Thus, capturing agents 202, 206, and 208 can operate in any environment.

As previously explained, capturing agents 202, 206, and 208 can send information about the network traffic they observe. This information can be sent to one or more remote devices, such as one or more servers, collectors, engines, etc. Each capturing agent can be configured to send respective information using a network address, such as an IP address, and any other communication details, such as port number, to one or more destination addresses or locations. Capturing agents 202, 206, and 208 can send metadata about one or more flows, packets, communications, processes, events, etc.

Capturing agents 202, 206, and 208 can periodically report information about each flow or packet they observe. The information reported can contain a list of flows or packets that were active during a period of time (e.g., between the current time and the time at which the last information was reported). The communication channel between the capturing agent and the destination can create a flow in every interval. For example, the communication channel between capturing agent 208 and collector 118 can create a control flow. Thus, the information reported by a capturing agent can also contain information about this control flow. For example, the information reported by capturing agent 208 to collector 118 can include a list of flows or packets that were active at hypervisor 108$_A$ during a period of time, as well as information about the communication channel between capturing agent 206 and collector 118 used to report the information by capturing agent 206.

Figure 2B:
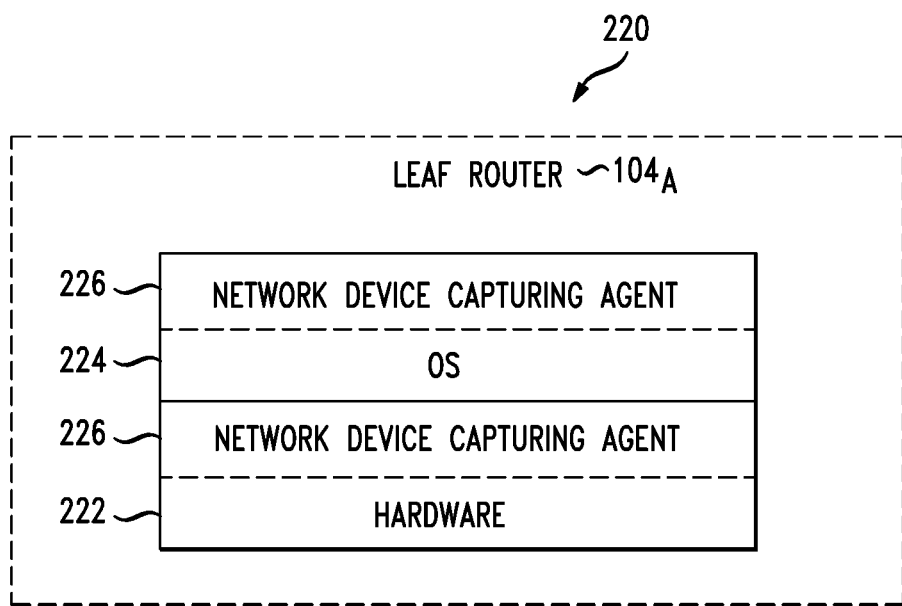
FIG. 2B illustrates a schematic diagram of an example capturing agent deployment in an example network device.

FIG. 2B illustrates a schematic diagram of example capturing agent deployment 220 in an example network device. The network device is described as leaf router $104_A$, as illustrated in FIG. 1. However, this is for explanation purposes. The network device can be any other network device, such as any other switch, router, etc.

In this example, leaf router $104_A$ can include network resources 222, such as memory, storage, communication, processing, input, output, and other types of resources. Leaf router $104_A$ can also include operating system environment 224. The operating system environment 224 can include any operating system, such as a network operating system, embedded operating system, etc. Operating system environment 224 can include processes, functions, and applications for performing networking, routing, switching, forwarding, policy implementation, messaging, monitoring, and other types of operations.

Leaf router $104_A$ can also include capturing agent 226. Capturing agent 226 can be an agent or sensor configured to capture network data, such as flows or packets, sent received, or processed by leaf router $104_A$. Capturing agent 226 can also be configured to capture other information, such as processes, statistics, users, alerts, status information, device information, etc. Moreover, capturing agent 226 can be configured to report captured data to a remote device or network, such as collector 118 shown in FIG. 1, for example. Capturing agent 226 can report information using one or more network addresses associated with leaf router $104_A$ or collector 118. For example, capturing agent 226 can be configured to report information using an IP assigned to an active communications interface on leaf router $104_A$.

Leaf router $104_A$ can be configured to route traffic to and from other devices or networks, such as server $106_A$. Accordingly, capturing agent 226 can also report data reported by other capturing agents on other devices. For example, leaf router $104_A$ can be configured to route traffic sent and received by server $106_A$ to other devices. Thus, data reported from capturing agents deployed on server $106_A$, such as VM and hypervisor capturing agents on server $106_A$, would also be observed by capturing agent 226 and can thus be reported by capturing agent 226 as data observed at leaf router $104_A$. Such report can be a control flow generated by capturing agent 226. Data reported by the VM and hypervisor capturing agents on server $106_A$ can therefore be a subset of the data reported by capturing agent 226.

Capturing agent 226 can run as a process or component (e.g., firmware, module, hardware device, etc.) in leaf router $104_A$. Moreover, capturing agent 226 can be installed on leaf router $104_A$ as a software or firmware agent. In some configurations, leaf router $104_A$ itself can act as capturing agent 226. Moreover, capturing agent 226 can run within operating system 224 and/or separate from operating system 224.

Figure 2C:
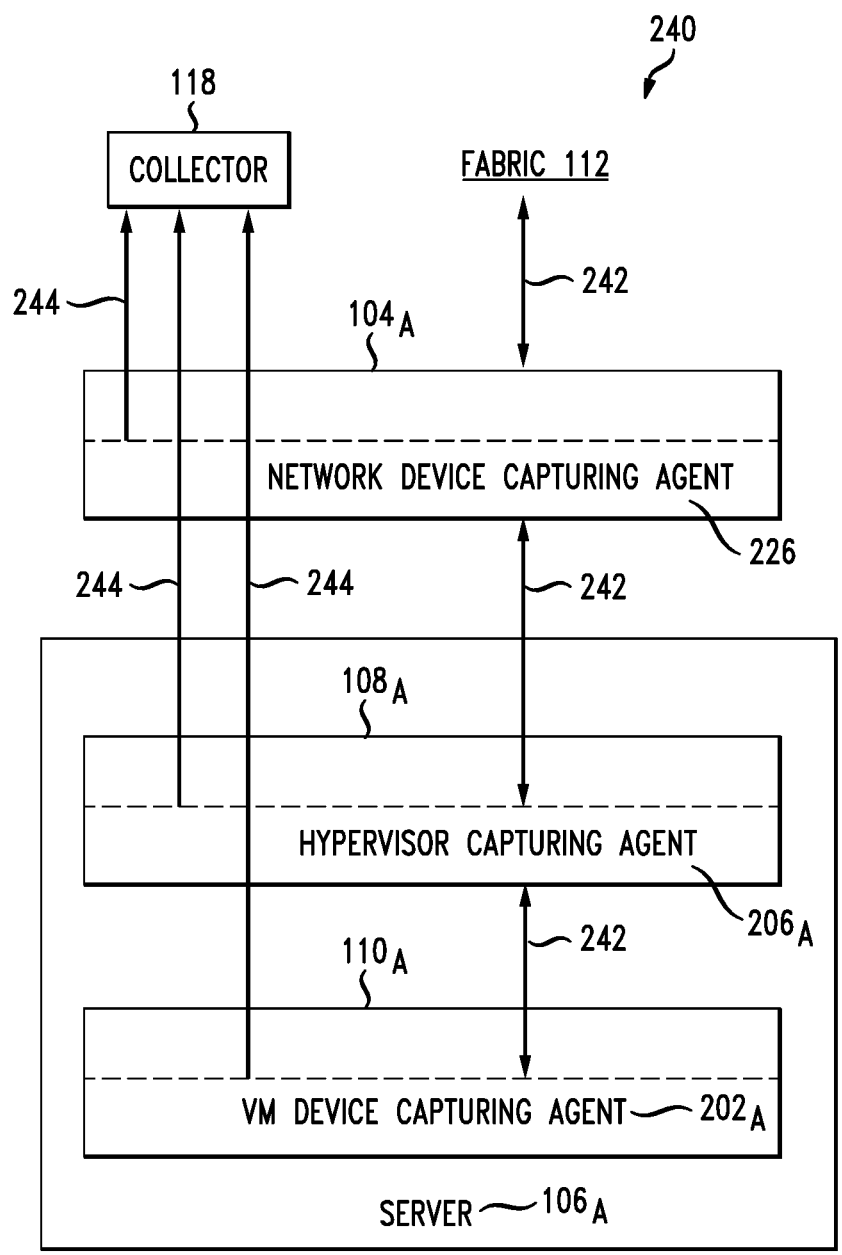
FIG. 2C illustrates a schematic diagram of an example reporting system in an example capturing agent topology.

FIG. 2C illustrates a schematic diagram of example reporting system 240 in an example capturing agent topology. The capturing agent topology includes capturing agents along a path from a Virtualized environment (e.g., VM and hypervisor) to the fabric 112.

Leaf router $104_A$ can route packets or traffic 242 between fabric 112 and server $106_A$, hypervisor $108_A$, and VM $110_A$. Packets or traffic 242 between VM $110_A$ and leaf router $104_A$ can flow through hypervisor $108_A$ and server $106_A$. Packets or traffic 242 between hypervisor $108_A$ and leaf router $104_A$ can flow through server $106_A$. Finally, packets or traffic 242 between server $106_A$ and leaf router $104_A$ can flow directly to leaf router $104_A$. However, in some cases, packets or traffic 242 between server $106_A$ and leaf router $104_A$ can flow through one or more intervening devices or networks, such as a switch or a firewall.

Moreover, VM capturing agent $202_A$ at VM $110_A$, hypervisor capturing agent $206_A$ at hypervisor $108_A$, network device capturing agent 226 at leaf router $104_A$, and any server capturing agent at server $106_A$ (e.g., capturing agent running on host environment of server $106_A$) can send reports 244 (also refereed to as control flows) to collector 118 based on the packets or traffic 242 captured at each respective capturing agent. Reports 244 from VM capturing agent $202_A$ to collector 118 can flow through VM $110_A$, hypervisor $108_A$, server $106_A$, and leaf router $104_A$. Reports 244 from hypervisor capturing agent $206_A$ to collector 118 can flow through hypervisor $108_A$, server $106_A$, and leaf router $104_A$. Reports 244 from any other server capturing agent at server $106_A$ to collector 118 can flow through server $106_A$ and leaf router $104_A$. Finally, reports 244 from network device capturing agent 226 to collector 118 can flow through leaf router $104_A$. Although reports 244 are depicted as being routed separately from traffic 242 in FIG. 2C, one of ordinary skill in the art will understand that reports 244 and traffic 242 can be transmitted through the same communication channel(s).

Reports 244 can include any portion of packets or traffic 242 captured at the respective capturing agents. Reports 244 can also include other information, such as timestamps, process information, capturing agent identifiers, flow identifiers, flow statistics, notifications, logs, user information, system information, etc. Some or all of this information can be appended to reports 244 as one or more labels, metadata, or as part of the packet(s)' header, trailer, or payload. For example, if a user opens a browser on VM $110_A$ and navigates to examplewebsite.com, VM capturing agent $202_A$ of VM $110_A$ can determine which user (i.e., operating system user) of VM $110_A$ (e.g., username "johndoe85") and which process being executed on the operating system of VM $110_A$ (e.g., "chrome.exe") were responsible for the particular network flow to and from examplewebsite.com. Once such information is determined, the information can be included in report 244 as labels for example, and report 244 can be transmitted from VM capturing agent $202_A$ to collector 118. Such additional information can help system 240 to gain insight into flow information at the process and user level, for instance. This information can be used for security, optimization, and determining structures and dependencies within system 240.

In some examples, the reports 244 can include various statistics and/or usage information reported by the respective capturing agents. For example, the reports 244 can indicate an amount of traffic captured by the respective capturing agent, which can include the amount of traffic sent, received, and generated by the capturing agent's host; a type of traffic captured, such as video, audio, Web (e.g., HTTP or HTTPS), database queries, application traffic, etc.; a source and/or destination of the traffic, such as a destination server or application, a source network or device, a source or destination address or name (e.g., IP address, DNS name, FQDN, packet label, MAC address, VLAN, VNID, VxLAN, source or destination domain, etc.); a source and/or destination port (e.g., port 25, port 80, port 443, port 8080, port 22); a traffic protocol; traffic metadata; etc. The reports 244 can also include indications of traffic or usage patterns and information, such as frequency of communications, intervals, type of requests, type of responses, triggering processes or events (e.g., causality), resource usage, etc.

Each of the capturing agents $202_A$, $206_A$, 226 can include a respective unique capturing agent identifier on each of reports 244 it sends to collector 118, to allow collector 118 to determine which capturing agent sent the report. Capturing agent identifiers in reports 244 can also be used to determine which capturing agents reported what flows. This information can then be used to determine capturing agent placement and topology, as further described below, as well as mapping individual flows to processes and users. Such additional insights gained can be useful for analyzing the data in reports 244, as well as troubleshooting, security, visualization, configuration, planning, and management, and so forth.

As previously noted, the topology of the capturing agents can be ascertained from the reports 244. To illustrate, a packet received by VM $110_A$ from fabric 112 can be captured and reported by VM capturing agent $202_A$. Since the packet received by VM $110_A$ will also flow through leaf router $104_A$ and hypervisor $108_A$, it can also be captured and reported by hypervisor capturing agent $206_A$ and network device capturing agent 226. Thus, for a packet received by VM $110_A$ from fabric 112, collector 118 can receive a report of the packet from VM capturing agent $202_A$, hypervisor capturing agent $206_A$, and network device capturing agent 226.

Similarly, a packet sent by VM $110_A$ to fabric 112 can be captured and reported by VM capturing agent $202_A$. Since the packet sent by VM $110_A$ will also flow through leaf router $104_A$ and hypervisor $108_A$, it can also be captured and reported by hypervisor capturing agent $206_A$ and network device capturing agent 226. Thus, for a packet sent by VM $110_A$ to fabric 112, collector 118 can receive a report of the packet from VM capturing agent $202_A$, hypervisor capturing agent $206_A$, and network device capturing agent 226.

On the other hand, a packet originating at, or destined to, hypervisor $108_A$, can be captured and reported by hypervisor capturing agent $206_A$ and network device capturing agent 226, but not VM capturing agent $202_A$, as such packet may not flow through VM $110_A$. Moreover, a packet originating at, or destined to, leaf router $104_A$, will be captured and reported by network device capturing agent 226, but not VM capturing agent $202_A$, hypervisor capturing agent $206_A$, or any other capturing agent on server $106_A$, as such packet may not flow through VM $110_A$, hypervisor $108_A$, or server $106_A$.

In another example, if the reports 244 indicate that the VM capturing agent 202 has been generating unexpected, improper, or excessive traffic, such as sending packets or commands to a new or different device other than collector 118—or other than any other system with which VM capturing agent 202 is expected or configured to communicate with—or sending the wrong types of packets (e.g., other than reports 244) or sending traffic at unexpected times or events (e.g., without being triggered by a predefined setting or event such as the capturing of a packet processed by the host), then one can assume that VM capturing agent 202 has been compromised or is being manipulated by an unauthorized user or device.

Reports 244 can be transmitted to collector 118 periodically as new packets or traffic 242 are captured by a capturing agent, or otherwise based on a schedule, interval, or event, for example. Further, each capturing agent can send a single report or multiple reports to collector 118 For example, each of the capturing agents can be configured to send a report to collector 118 for every flow, packet, message, communication, or network data received, transmitted, and/or generated by its respective host (e.g., VM $110_A$, hypervisor $108_A$, server $106_A$, and leaf router $104_A$). As such, collector 118 can receive a report of a same packet from multiple capturing agents. In other examples, one or more capturing agents can be configured to send a report to collector 118 for one or more flows, packets, messages, communications, network data, or subset(s) thereof, received, transmitted, and/or generated by the respective host during a period of time or interval.

Figure 3:
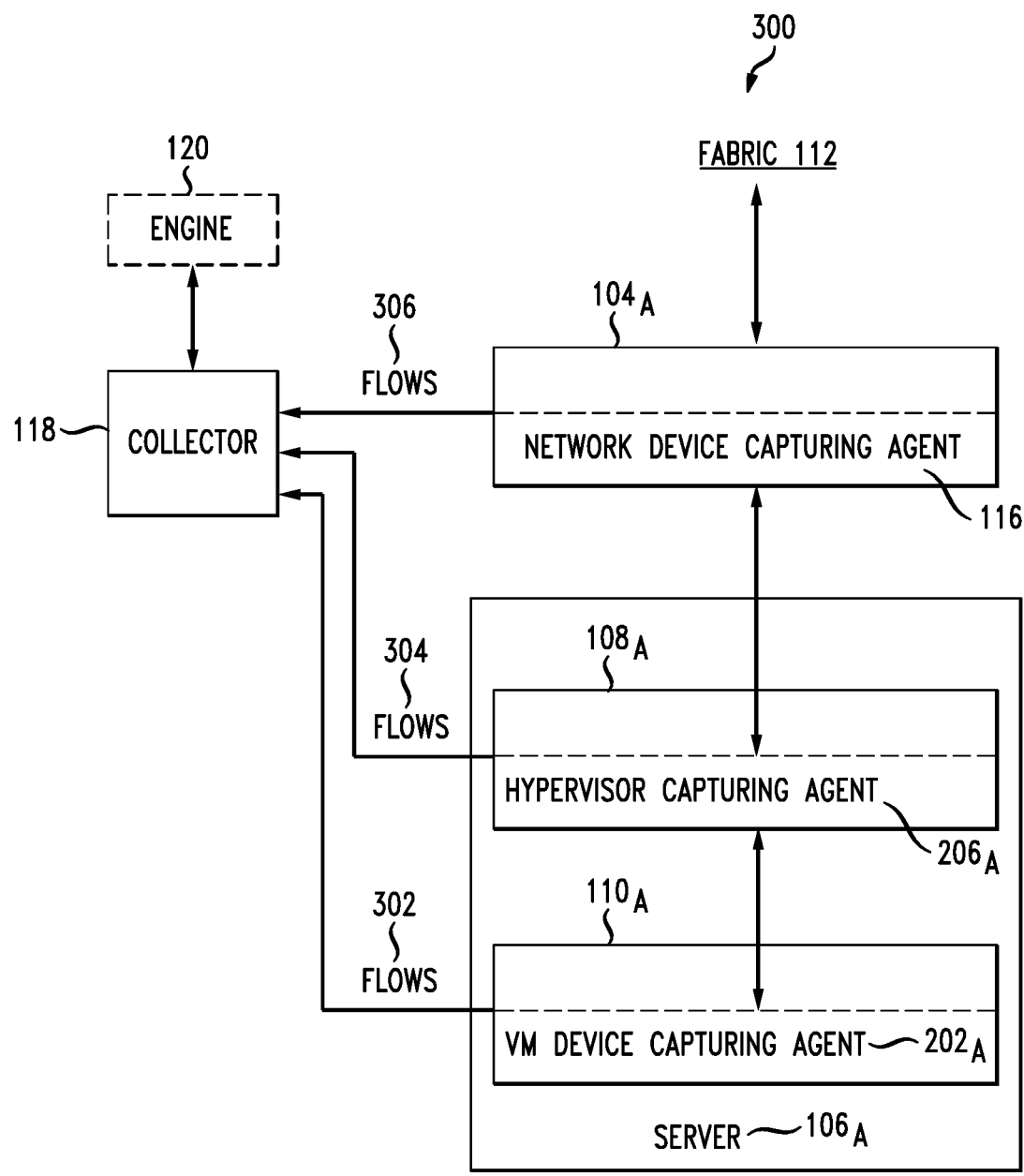
FIG. 3 illustrates a schematic diagram of an example configuration for collecting capturing agent reports.

FIG. 3 illustrates a schematic diagram of an example configuration 300 for collecting capturing agent reports (i.e., control flows). In configuration 300, traffic between fabric 112 and VM $110_A$ is configured to flow through hypervisor $108_A$. Moreover, traffic between fabric 112 and hypervisor $108_A$ is configured to flow through leaf router $104_A$.

VM capturing agent $202_A$ can be configured to report to collector 118 traffic sent, received, or processed by VM $110_A$. Hypervisor capturing agent 210 can be configured to report to collector 118 traffic sent, received, or processed by hypervisor $108_A$. Finally, network device capturing agent 226 can be configured to report to collector 118 traffic sent, received, or processed by leaf router $104_A$.

Collector 118 can thus receive flows 302 from VM capturing agent $202_A$, flows 304 from hypervisor capturing agent $206_A$, and flows 306 from network device capturing agent 226. Flows 302, 304, and 306 can include control flows. Flows 302 can include flows captured by VM capturing agent $202_A$ at VM $110_A$.

Flows 304 can include flows captured by hypervisor capturing agent $206_A$ at hypervisor $108_A$. Flows captured by hypervisor capturing agent $206_A$ can also include flows 302 captured by VM capturing agent $202_A$, as traffic sent and received by VM $110_A$ will be received and observed by hypervisor $108_A$ and captured by hypervisor capturing agent $206_A$.

Flows 306 can include flows captured by network device capturing agent 226 at leaf router $104_A$. Flows captured by network device capturing agent 226 can also include flows 302 captured by VM capturing agent $202_A$ and flows 304 captured by hypervisor capturing agent $206_A$, as traffic sent and received by VM $110_A$ and hypervisor $108_A$ is routed through leaf router $104_A$ and can thus be captured by network device capturing agent 226.

Collector 118 can collect flows 302, 304, and 306, and store the reported data. Collector 118 can also forward some or all of flows 302, 304, and 306, and/or any respective portion thereof to engine 120. Engine 120 can process the information, including any information about the capturing agents (e.g., agent placement, agent environment, etc.) and/or the captured traffic (e.g., statistics), received from collector 118 to identify patterns, conditions, network or device characteristics; log statistics or history details; aggregate and/or process the data; generate reports, timelines, alerts, graphical user interfaces; detect errors, events, inconsistencies; troubleshoot networks or devices; configure networks or devices; deploy services or devices; reconfigure services, applications, devices, or networks; etc.

Collector 118 and/or engine 120 can map individual flows that traverse VM $110_A$, hypervisor $108_A$, and/or leaf router $104_A$ to the specific capturing agents at VM $110_A$, hypervisor $108_A$, and/or leaf router $104_A$. For example, collector 118 or engine 120 can determine that a particular flow that originated from VM $110_A$ and destined for fabric 112 was sent by VM $110_A$ and such flow was reported by VM capturing agent 202. It may be determined that the same flow was received by a process named Z on hypervisor $108_A$ and forwarded to a process named W on leaf router 104$_A$ and also reported by hypervisor capturing agent 206.

While engine 120 is illustrated as a separate entity, other configurations are also contemplated herein. For example, engine 120 can be part of collector 118 and/or a separate entity. Indeed, engine 120 can include one or more devices, applications, nodules, databases, processing components, elements, etc. Moreover, collector 118 can represent one or more collectors. For example, in some configurations, collector 118 can include multiple collection systems or entities, which can reside in one or more networks.

Figure 4:
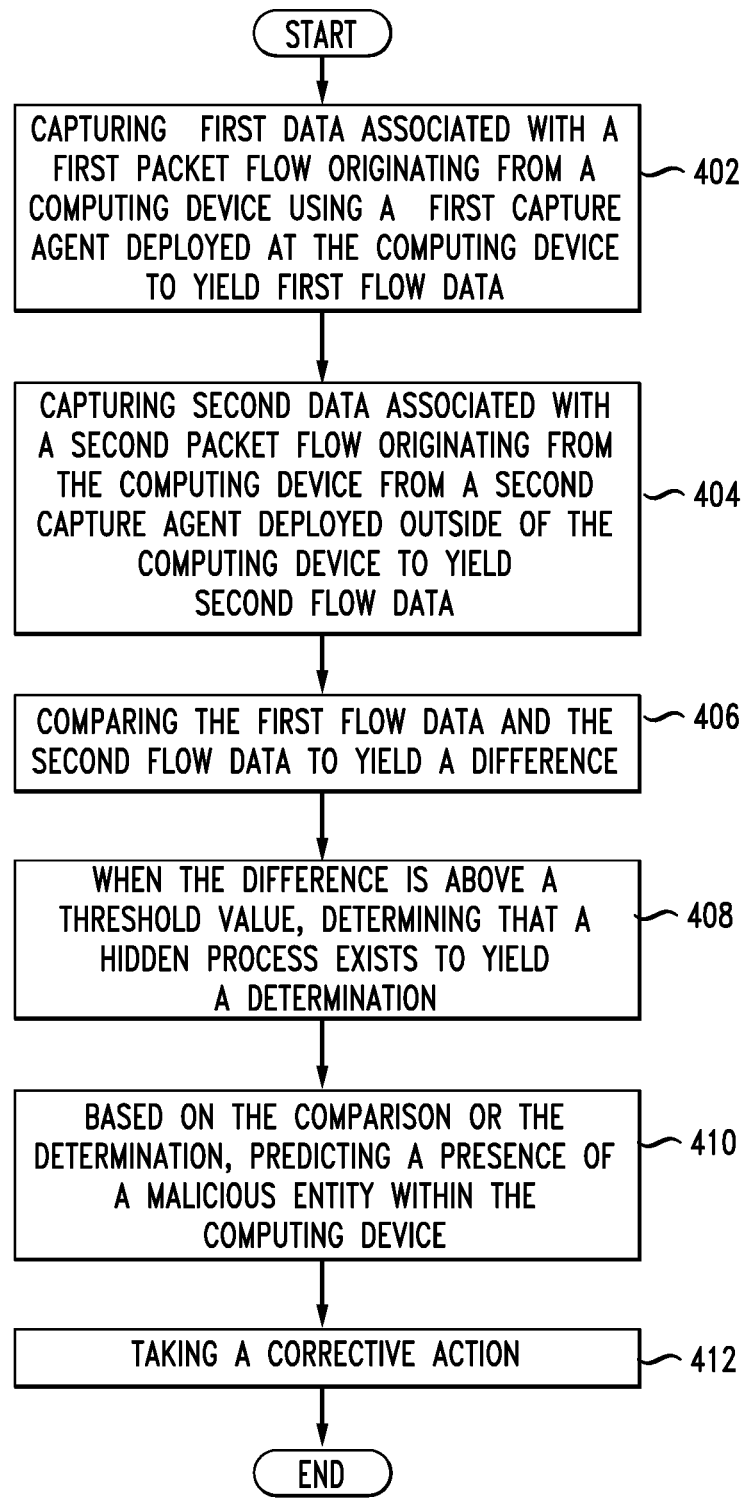
FIG. 4 illustrates an example method embodiment.

Having disclosed some basic system components and concepts, the disclosure now turns to the exemplary method embodiment shown in FIG. 4. For the sake of clarity, the method is described in terms of collector 118 and capturing agents 116, as shown in FIG. 1, configured to practice the various steps in the method. However, the example methods can be practiced by any software or hardware components, devices, etc. heretofore disclosed. The steps outlined herein are exemplary and can be implemented in any combination thereof in any order, including combinations that exclude, add, or modify certain steps.

The current disclosure provides a methodology and technique for observing and capturing information about network traffic in a datacenter. While most network traffic is legitimate, some network traffic is generated by malicious code for the purpose of data theft or for other malicious intent like communication with a remote command and control server. Malicious entities (e.g., rootkits, malware) have it in their best interest to hide their associated processes in the flows from administrators, firewalls, or IDS systems. A process can be hidden at multiple levels depending on the sophistication of the malicious code and level of infection. It is possible to send traffic out of a compute environment without being detected by any packet capture agent or the OS itself installed on that compute node. It is also possible to send traffic out with one or more processes being hidden in the flow. However, once placed on the physical network, these packets will have to pass through the networking gear (switch, etc.) attached to the compute environment.

The present disclosure leverages the that packets must pass through the network to identify a hidden process in a flow. Note that for packets coming out of a virtual NIC, the packets will have to always pass through a virtual switch or virtual bridge, or something similar based on the hypervisor technology. In all cases, a network capture agent sitting outside the above mentioned compute environment, and observing packets on the interface which receives all the outgoing network traffic, can observe all packets including the ones that are hidden to an observer inside the compute environment or have any hidden processes.

Using at least two observation reference points, out of which at least one is inside the compute environment being monitored and one is outside the compute environment being monitored, the system disclosed herein can detect any hidden processes in network flows.

The goal is to detect a hidden process in a flow, and attribute it back to the compute environment generating such flows. The compute environment can be the same environment from which the packet flows originate or may be some separate environment. Such a compute environment has a high chance of being infected by a malware which is trying to send traffic while hiding a process in the flow to go undetected. Network traffic coming out of a compute environment (whether from a container, VM, hypervisor or physical server) is captured by entities called sensors or capture agents which can be deployed in or inside different environments. Sensors export data or metadata of the observed network activity to collection agents called "Collectors." Collectors can be a group of processes running on a single machine or a cluster of machines. For sake of simplicity we will treat all collectors as one logical entity and refer to it as one Collector in our discussion.

In actual deployment of datacenter scale, there will be more than just one collector, each responsible for handling export data from a group of sensors. The collector is capable of sending the processed or unprocessed data to a cluster of processes responsible for analysis of network data. Pipelines receive the data from collector can be referred to as a cluster of processes. Note that sensors and collectors are not limited to observing and processing just network data, but can also capture other system information like currently active processes, active file handles, socket handles, status of I/O devices, memory, etc.

This patent application focuses on detecting hidden processes in network traffic, and thus the disclosure is focused on just on network data captured by the sensors. Using the network data captured by sensors deployed at various levels and locations, the algorithm disclosed runs a comparison algorithm to solve the problem of detecting hidden processes in flows. The algorithm performs a differential analysis of packets and processes detected and captured at two reference points along a path in order to detect the hidden processes in flows. Once a hidden process in a flow has been identified, the system can take corrective actions and make adjustments to limit the harm caused by malware or threat.

FIG. 4 illustrates a method aspect of this disclosure. An exemplary method can be performed by a system or any computing device whether physical or virtual. The method includes capturing first data associated with a first packet flow originating from a computing device (a first host) using a first capture agent deployed at the computing device to yield first flow data (402), capturing second data associated with a second packet flow originating from the computing device from a second capture agent deployed outside of the computing device (such as a second host) to yield second flow data (404) and comparing the first flow data and the second flow data to yield a difference (406). When the difference is above a threshold value, the method includes determining that a hidden process exists to yield a determination (408). The first data and the second data can include metadata associated respectively with the first packet flow and the second packet flow, network data or packet content data. The first flow data and the second flow data are preferably captured at a collector. The collector receives the first flow data and the second flow data and performs the step of comparing the first flow data and the second flow data. Based on the comparison, the system can identify the computing device as a generator of the hidden process. The system could also identify a different compute environment as the source of the hidden process. Based on the comparison or the determination, the system can perform the step of predicting a presence of a malicious entity within the computing device (410). The system can also take a corrective action (412) such as one or more of: isolating a virtual machine, isolating a container, limiting packets to and from the computing device, requiring all packets to and from the computing device to flow through an operating stack of the computing device, isolating the computing device, shutting down the computing device, and notifying an administrator. Other correcting actions are contemplated herein. Non-limiting examples of correcting actions include, without limitation, blacklisting a source/sender, address, or flow; adjusting the granularity of data captured and/or reported by the capturing agents associated with the hidden traffic; adjusting one or more network or security rules or policies, such as a firewall rule, an access policy, a traffic or resource allocation policy, a policy defining the availability and/or use of resources by elements associated with the hidden traffic and/or for processing the hidden network traffic; flagging the hidden traffic; separating the hidden traffic from other traffic collected (e.g., maintaining the hidden traffic at a separate location, log, and/or storage), etc.

The malicious entity of course can be in any host whether it is a physical and/or software switch, a physical or virtual server, a computing device, a hypervisor, a virtual machine, a container, an operating system (e.g., host operating system, guest operating system, kernel, etc.), an ASIC (application specific integrated circuit), a controller (e.g., BMC), a memory device, a virtual workload, and so forth. The malicious entity or hidden traffic generator can infect any physical, virtual/software device or host. Additional information about the packet flows can be derived from one or more external, such as malware trackers or lookup databases (e.g., whois, etc.), and/or data obtained from the various layers of a network including a physical layer, a hypervisor layer and a virtual layer. The packet flow data from the various capture agents can be based, at least in part, on capture agents configured in a device hardware layer $104_A$, a hypervisor layer $108_A$, and/or a virtual machine layer $110_A$. The data obtained from these capture agents can also be coordinated with external data or other data to arrive at conclusions about the packet flow.

With the information at the various levels, increased fine tuning in terms of identifying hidden processes can occur with respect to identifying more specific details about the packet flow at various layers. For example, detecting traffic flow information between different layers such as at a hypervisor as well as one of its virtual machines, can provide data to identify a hidden process and particularly a process that seeks to bypass an operating system layer in the entity which is hosting the course of the hidden process.

The hypervisors will each have a virtual or software switch and each virtual machine can also have a virtual network interface. With the disclosure, one can analyze the behavior of these virtual switches and/or virtual network interfaces and use that data for identifying hidden processes. Various inferences can be made based on behavior detected at different layers and/or by different components (e.g., physical or virtual switches, virtual network interfaces, etc.). Information about the topology of the various hosts and/or capturing agents can be helpful when analyzing the reported data for determining malicious activity or hidden processes or traffic. For example, traffic captured by an agent residing at a virtual machine should also be reported by the agent residing at the hypervisor hosting the virtual machine.

With knowledge about the topology, identity, settings, and type of hosts involved in a reported communication, specific inferences can be made if the captured and/or reported data indicates a pattern or deviation from the activity or behavior expected based on such knowledge. In other examples, knowledge about the corresponding forwarding models or patterns for each of the different layers or switching elements (e.g., software switch at a hypervisor, virtual network interface at virtual machine, etc.) can be considered along with the reported data from the capturing agents to infer malicious activity or abnormal behavior.

Figure 5:
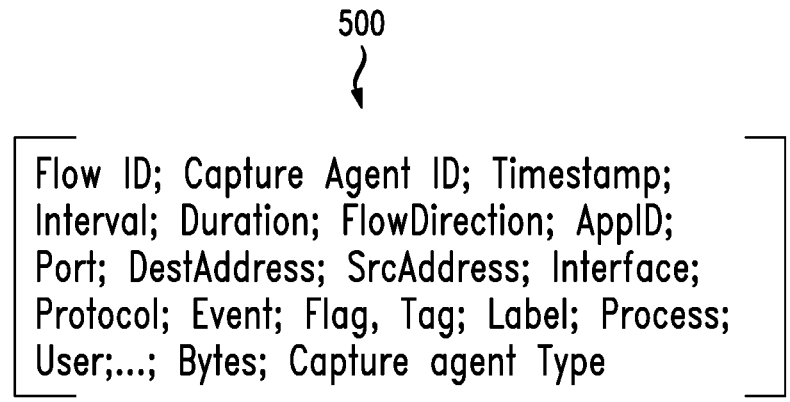
FIG. 5 illustrates a listing of example fields on a capturing agent report.

FIG. 5 illustrates a listing 500 of example fields on a capturing agent report. The listing 500 can include one or more fields, such as:

Flow identifier (e.g., unique identifier associated with the flow).

Capturing agent identifier (e.g., data uniquely identifying reporting capturing agent).

Timestamp (e.g., time of event, report, etc.).

Interval (e.g., time between current report and previous report, interval between flows or packets, interval between events, etc.).

Duration (e.g., duration of event, duration of communication, duration of flow duration of report, etc.).

Flow direction (e.g., egress flow, ingress flow, etc.).

Application identifier (e.g., identifier of application associated with flow, process, event, or data).

Port (e.g., source port, destination port, layer 4 port, etc.).

Destination address (e.g., interface address associated with destination. IP address, domain name, network address, hardware address, virtual address, physical address, etc.).

Source address (e.g., interface address associated with source, IP address, domain name, network address, hardware address, virtual address, physical address, etc.).

Interface (e.g., interface address, interface information, etc.).

Protocol (e.g., layer 4 protocol, layer 3 protocol, etc.).

Event (e.g., description of event, event identifier, etc.).

Flag (e.g., layer 3 flag, flag options, etc.).

Tag (e.g., virtual local area network tag, etc.)

Process (e.g., process identifier, etc.).

User (e.g., OS username, etc.).

Bytes (e.g., flow size, packet size, transmission size, etc.).

Sensor Type (e.g., the type of virtualized environment hosting the capturing agent, such as hypervisor or VM; the type of virtual network device, such as VNIC, LINUX bridge, OVS, software switch, etc.).

The listing 500 includes a non-limiting example of fields in a report. Other fields and data items are also contemplated herein, such as handshake information, system information, network address associated with capturing agent or host, operating system environment information, network data or statistics, process statistics, system statistics, etc. The order in which these fields are illustrated is also exemplary and can be rearranged in any other way. One or more of these fields can be part of a header, a trailer, or a payload of in one or more packets. Moreover, one or more of these fields can be applied to the one or more packets as labels. Each of the fields can include data, metadata, and/or any other information relevant to the fields.

Figure 6:
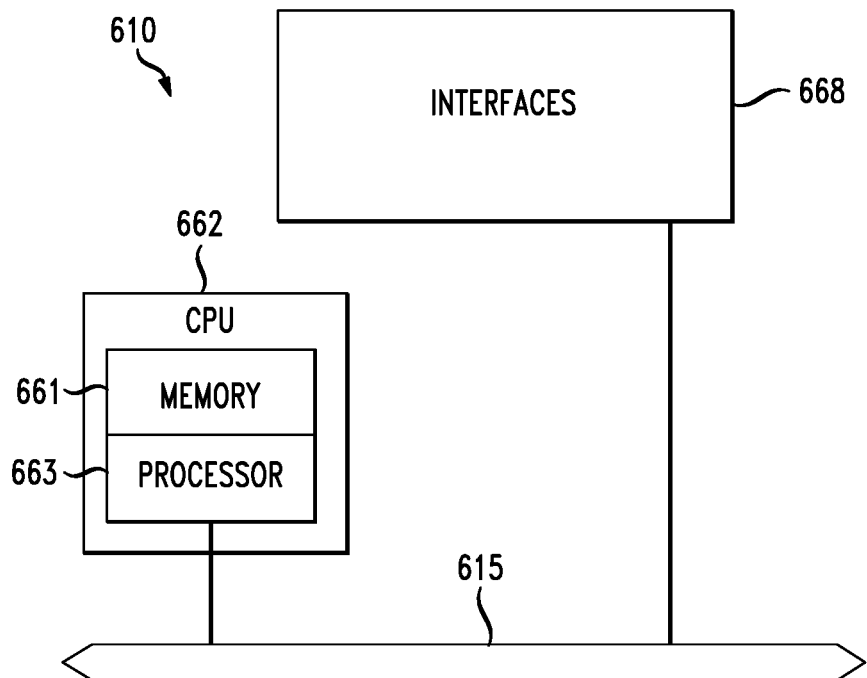
FIG. 6 illustrates an example network device.
Figure 7A:
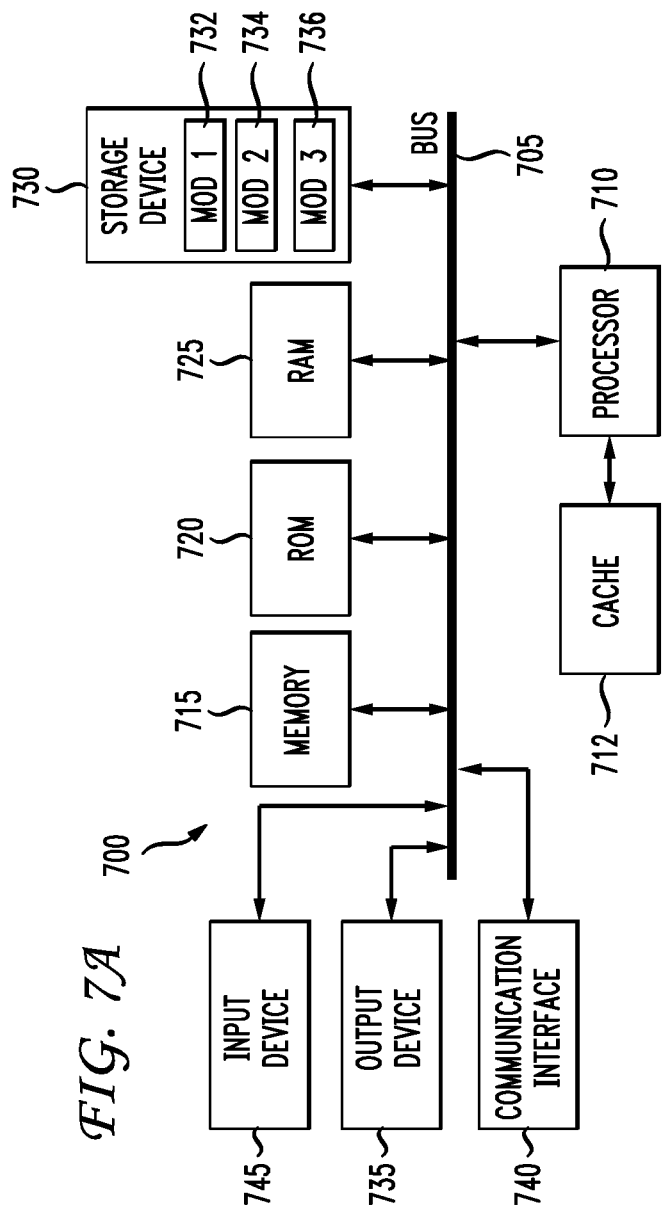
FIGS. 7A and 7B illustrate example system embodiments.
Figure 7B:
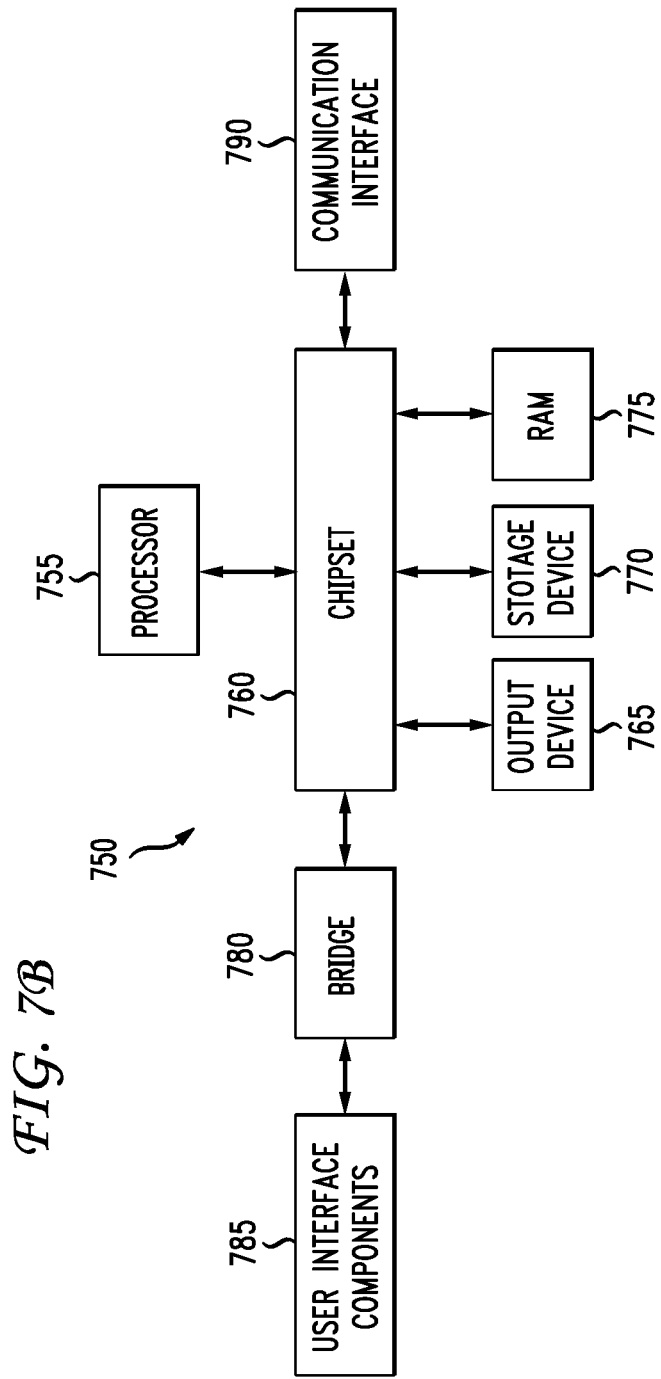

The disclosure now turns to the example network device and system illustrated in FIGS. 6 and 7A-B.

FIG. 6 illustrates an example network device 610 according to some embodiments. Network device 610 includes a master central processing unit (CPU) 662, interfaces 668, and a bus 615 (e.g., a PCI bus). When acting under the control of appropriate software or firmware, the CPU 662 is responsible for executing packet management, error detection, and/or routing functions. The CPU 662 preferably accomplishes all these functions under the control of software including an operating system and any appropriate applications software. CPU 662 may include one or more processors 663 such as a processor from the Motorola family of microprocessors or the MIPS family of microprocessors. In an alternative embodiment, processor 663 is specially designed hardware for controlling the operations of router 610. In a specific embodiment, a memory 661 (such as non-volatile RAM and/or ROM) also forms part of CPU 662. However, there are many different ways in which memory could be coupled to the system.

The interfaces 668 are typically provided as interface cards (sometimes referred to as "line cards"). Generally, they control the sending and receiving of data packets over the network and sometimes support other peripherals used with the router 610. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI faces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform muting computations network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 661) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 7A and FIG. 7B illustrate example system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROW 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates an example computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output device 765, such as display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that example systems 700 and 750 can have more than one processor 710/755 or be part of a group or cluster of computing devices networked together to provide greater processing capability. In one aspect, reference to a "processor" can mean a group of processors of the same or different types. For example, the "processor" can include a central processing unit and a graphical processing unit. The "processor" can include one or multiple virtual and/or hardware processors.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit strewn and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed:

1. A method comprising:
    capturing first data associated with a first packet flow originating from a first host using a first capture agent deployed at the first host to yield first flow data;
    capturing second data associated with a second packet flow originating from the first host from a second capture agent deployed at a second host to yield second flow data, wherein the first capture agent is deployed at a first layer of a network and the second capture agent is deployed at a second layer of the network, wherein the first layer and the second layer are different layers;

comparing the first flow data and the second flow data to yield a difference;

when the difference is above a threshold value, yielding a determination, the determination including that the second packet flow includes a hidden process and the second packet flow was transmitted by a component that bypassed an operating stack of the first host; and taking a corrective action based on the determination, the corrective action including isolating a container, isolating a virtual machine, or isolating the first host.

2. The method of claim 1, wherein the first data and the second data comprise metadata associated respectively with the first packet flow and the second packet flow.

3. The method of claim 1, wherein the first data comprises first packet content of the first packet flow and the second data comprise second packet content of the second packet flow.

4. The method of claim 1, wherein the first flow data and the second flow data are captured at a collector.

5. The method of claim 1, wherein a collector receives the first flow data and the second flow data and performs the step of comparing the first flow data and the second flow data.

6. The method of claim 1, further comprising:
identifying the first host as a generator of the hidden process.

7. The method of claim 1, wherein the first flow data and the second flow data comprise network data.

8. The method of claim 1, further comprising:
predicting a presence of a malicious entity within the first host based on the determination.

9. The method of claim 1, wherein the corrective action is shutting down the first host.

10. The method of claim 1, wherein the corrective action includes one or more of limiting packets to and from the first host, requiring all packets to and from the first host to flow through the operating stack of the first host, or notifying an administrator.

11. A system comprising:
a processor; and
a non-transitory computer-readable storage medium storing instructions which, when executed by the processor, cause the processor to perform operations comprising:
capturing first data associated with a first packet flow originating from a first host using a first capture agent deployed at the first host to yield first flow data;
capturing second data associated with a second packet flow originating from the first host from a second capture agent deployed on a second host to yield second flow data, wherein the first capture agent is deployed at a first layer of a network and the second capture agent is deployed at a second layer of the network, wherein the first layer and the second layer are different layers;
comparing the first flow data and the second flow data to yield a difference;
when the difference is above a threshold value, yielding a determination, the determination including that the second packet flow was transmitted by a component that bypassed an operating stack of the first host and the second packet flow includes a hidden packet; and
taking a limiting action associated with a flow of packets to or from the first host based on the determination, the limiting action including isolating a container, isolating a virtual machine, or isolating the first host.

12. The system of claim 11, wherein the first data and the second data comprise metadata associated respectively with the first packet flow and the second packet flow.

13. The system of claim 11, wherein the first data comprises first packet content of the first packet flow and the second data comprise second packet content of the second packet flow.

14. The system of claim 11, wherein the first flow data and the second flow data are captured at a collector.

15. The system of claim 11, wherein a collector receives the first flow data and the second flow data and performs the step of comparing the first flow data and the second flow data.

16. The system of claim 11, wherein the operations include predicting a presence of a malicious entity within first host or the second host based on determination.

17. The system of claim 11, wherein the limiting action comprises one of limiting packets to and from the first host, requiring all packets to and from the first host to flow through the operating stack of the first host, shutting down the first host, or notifying an administrator.

18. A non-transitory computer-readable storage device that stores instructions which, when executed by a processor, cause the processor to perform further operations comprising:
capturing first data associated with a first packet flow originating from a first host using a first capture agent deployed at the first host to yield first flow data;
capturing second data associated with a second packet flow originating from the first host from a second capture agent deployed at a second host to yield second flow data, wherein the first capture agent is deployed at a first layer of a network and the second capture agent is deployed at a second layer of the network, wherein the first layer and the second layer are different layers;
comparing the first flow data and the second flow data to yield a difference;
when the difference is above a threshold value, yielding a determination, the determination including that the second packet flow was transmitted by a component that bypassed an operating stack of the first host and the second packet flow includes a hidden packet; and
taking a limiting action associated with a flow of packets to or from the first host based on the determination, the limiting action including isolating a container, isolating a virtual machine, or isolating the first host.

19. The non-transitory computer-readable storage device of claim 18, wherein the first data and the second data comprise metadata associated respectively with the first packet flow and the second packet flow.

20. The non-transitory computer-readable storage device of claim 18, wherein the first packet flow and the second packet flow are captured at a collector, the collector configured to perform the comparing of the first packet flow and the second packet flow and to yield the difference.

* * * * *